(12) United States Patent
Rusch

(10) Patent No.: US 12,070,871 B2
(45) Date of Patent: Aug. 27, 2024

(54) HAND-HELD POWER TOOL HAVING A BEARING ARRANGEMENT

(71) Applicant: Festool GmbH, Wendlingen (DE)

(72) Inventor: Marc Rusch, Esslingen (DE)

(73) Assignee: FESTOOL GMBH, Wendlingen (DE)

( * ) Notice: Subject to any disclaimer, the term of this patent is extended or adjusted under 35 U.S.C. 154(b) by 721 days.

(21) Appl. No.: 16/761,068

(22) PCT Filed: Oct. 26, 2018

(86) PCT No.: PCT/EP2018/079490
§ 371 (c)(1),
(2) Date: May 1, 2020

(87) PCT Pub. No.: WO2019/086352
PCT Pub. Date: May 9, 2019

(65) Prior Publication Data
US 2020/0282588 A1    Sep. 10, 2020

(30) Foreign Application Priority Data

Nov. 2, 2017 (DE) .......................... 102017125664.4
Nov. 10, 2017 (DE) .......................... 102017126486.8

(51) Int. Cl.
*B27B 9/04* (2006.01)
*B23D 47/12* (2006.01)
(Continued)

(52) U.S. Cl.
CPC ................ *B27B 9/04* (2013.01); *B23D 47/12* (2013.01); *B23D 59/003* (2013.01); *B25F 5/021* (2013.01)

(58) Field of Classification Search
CPC .... B27B 9/00; B27B 9/02; B27B 9/04; B23D 59/00; B23D 59/001; B23D 59/002;
(Continued)

(56) References Cited

U.S. PATENT DOCUMENTS 5,662,440 A     9/1997  Kikuchi et al.
6,739,060 B1 *  5/2004  Huang ....................... B27B 9/00
                                                        125/13.01
(Continued)

FOREIGN PATENT DOCUMENTS

CN      104551224       4/2015
CN      104551224 A     4/2015
(Continued)

*Primary Examiner* — Evan H Macfarlane
(74) *Attorney, Agent, or Firm* — Hoffmann & Baron LLP

(57) ABSTRACT

A hand-held power tool for machining a workpiece, comprising a drive motor, a tool holder, which can be driven by the drive motor, and which is for a working tool for machining the workpiece, and a guide element having a guide surface for guiding the hand-held power tool on the workpiece in a working direction, wherein the tool holder is mounted via a bearing arrangement such that it moves relative to the guide element and the tool holder can be driven by a servo motor arrangement, wherein the hand-held power tool can be swivelled via the bearing arrangement about at least one adjusting swivel axis passing through the guide surface at an angle, in particular at a right angle, for the relative adjustment of the tool holder relative to the guide element, wherein the hand-held power tool has a control device for controlling the servo motor arrangement.

12 Claims, 7 Drawing Sheets

(51) Int. Cl.
*B23D 59/00* (2006.01)
*B25F 5/02* (2006.01)

(58) Field of Classification Search
CPC .. B23D 59/003; B23D 59/007; B23D 59/008; B25F 5/021
See application file for complete search history.

(56) References Cited

U.S. PATENT DOCUMENTS

| | | | |
|---|---|---|---|
| 10,456,883 B2 * | 10/2019 | Rivers | B23Q 17/2428 |
| 11,226,608 B2 * | 1/2022 | Rusch | G01B 21/00 |
| 2008/0034596 A1 | 2/2008 | Barnes | |
| 2009/0025233 A1 * | 1/2009 | Kaiser | B23D 49/167 30/392 |
| 2011/0190936 A1 | 8/2011 | Koeder et al. | |
| 2013/0118332 A1 | 5/2013 | Barnes | |
| 2015/0094836 A1 | 4/2015 | Rivers et al. | |
| 2016/0048122 A1 | 2/2016 | Lukosz et al. | |

FOREIGN PATENT DOCUMENTS

| | | |
|---|---|---|
| CN | 105081455 | 11/2015 |
| CN | 105081455 A | 11/2015 |
| CN | 105290504 | 2/2016 |
| CN | 105290504 A | 2/2016 |
| CN | 107530878 | 1/2018 |
| CN | 107530878 A | 1/2018 |
| DE | 10043551 | 5/2002 |
| DE | 10043551 A1 | 5/2002 |
| DE | 202004005478 | 7/2004 |
| DE | 202004005478 U1 | 7/2004 |
| DE | 102007010249 | 9/2008 |
| DE | 102007010249 A1 | 9/2008 |
| DE | 102008040064 | 1/2010 |
| DE | 102008040064 A1 | 1/2010 |
| DE | 102009029426 | 3/2011 |
| DE | 102009029426 A1 | 3/2011 |
| DE | 102014001577 | 8/2015 |
| DE | 102014001577 A1 | 8/2015 |

* cited by examiner

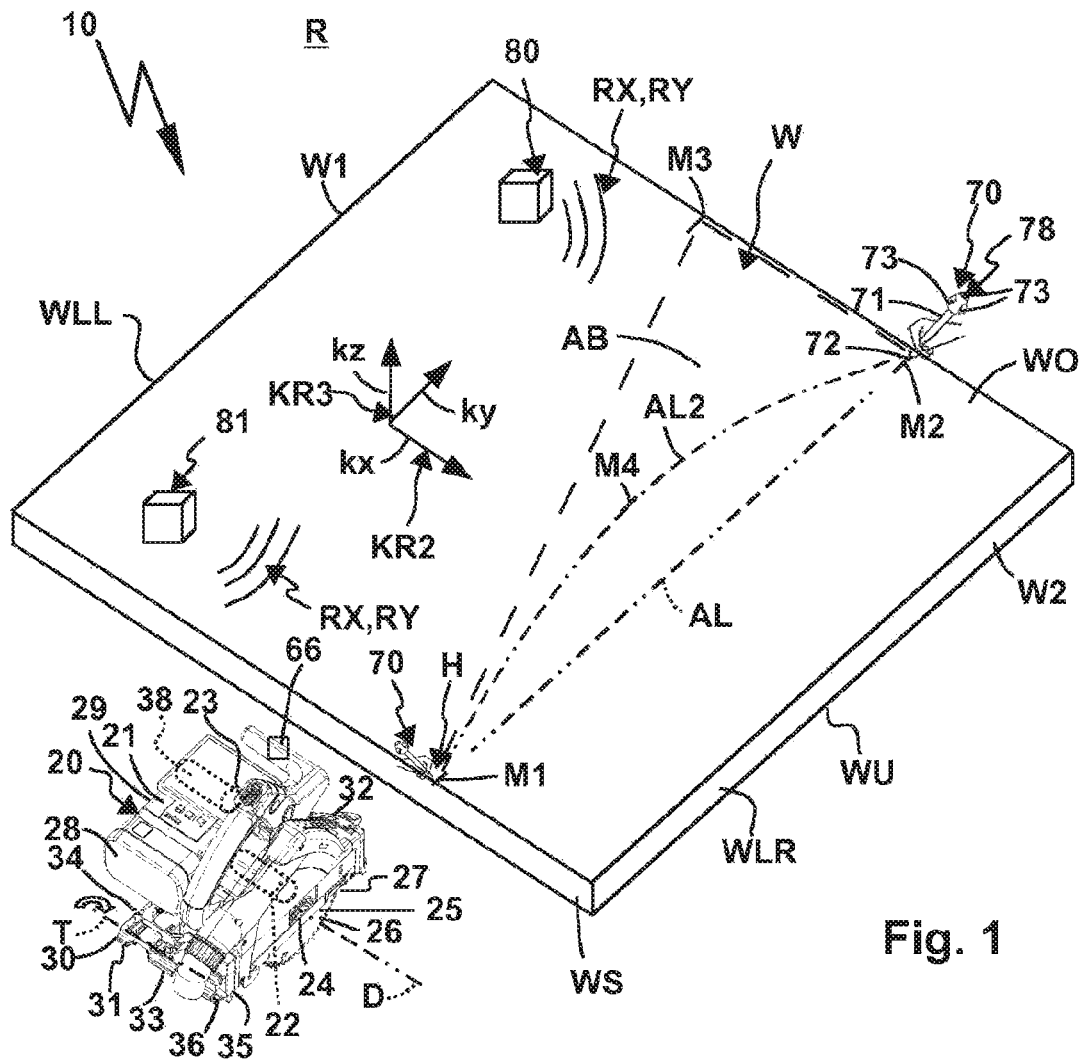
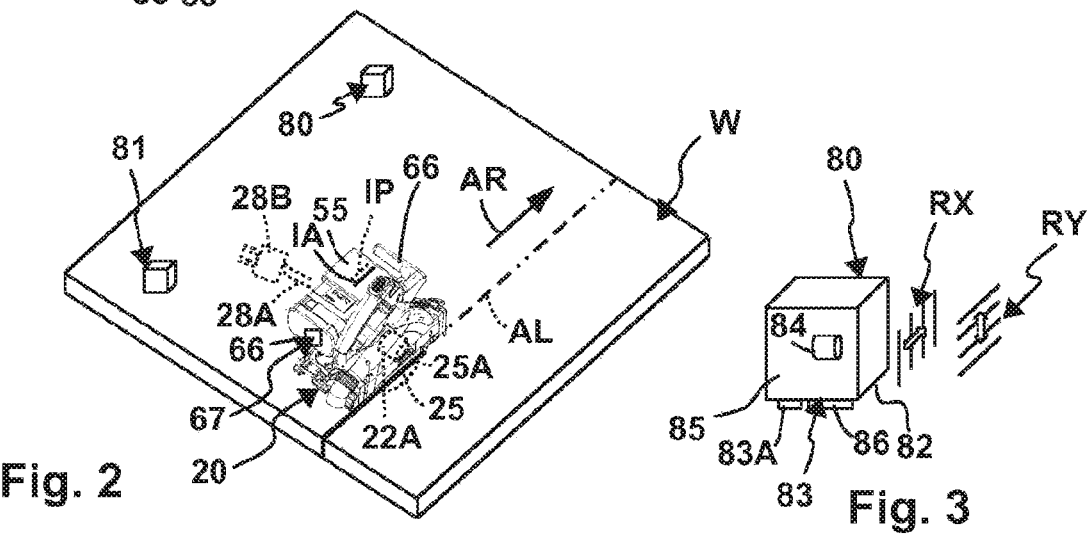
Fig. 1
Fig. 2
Fig. 3

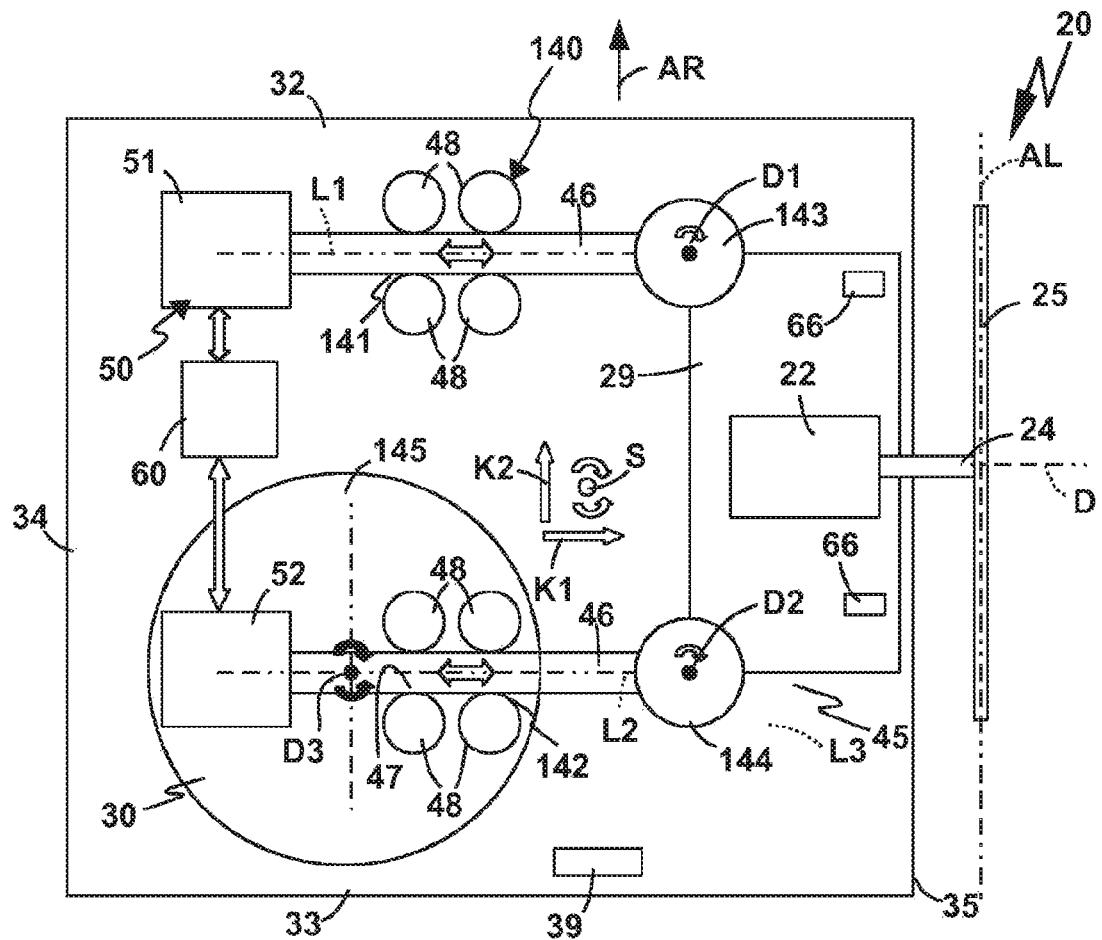
Fig. 9
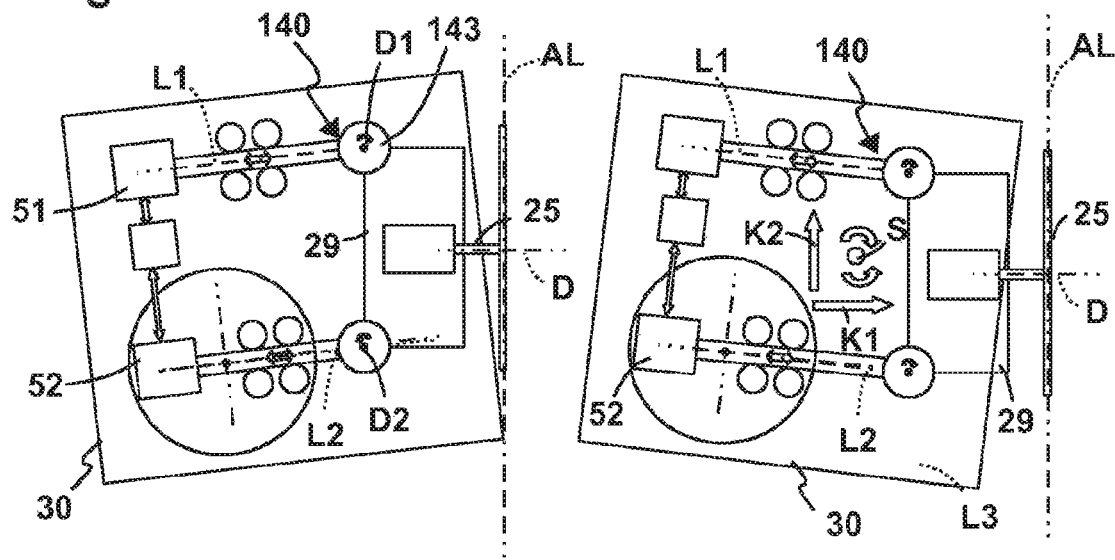
Fig. 10
Fig. 11

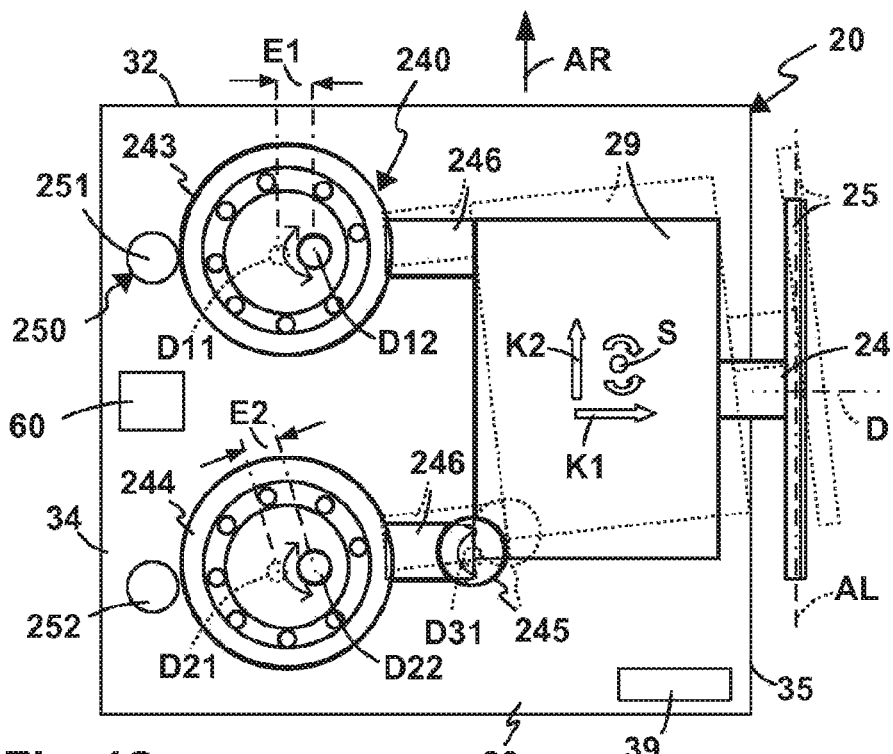
Fig. 12
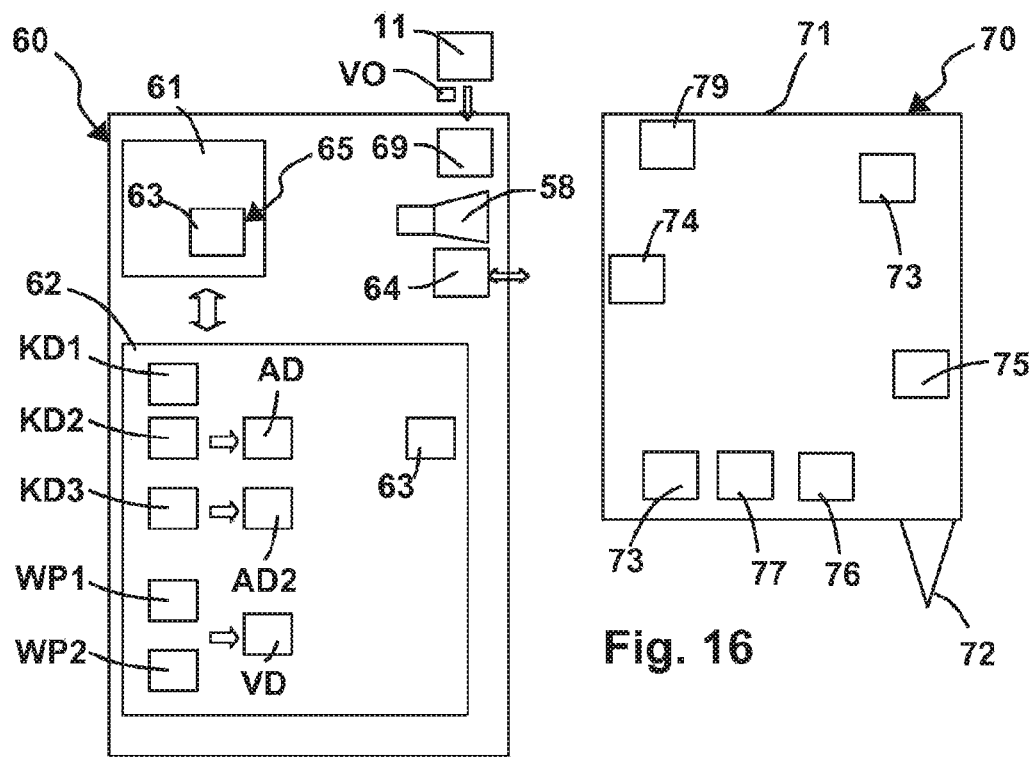
Fig. 13
Fig. 16

HAND-HELD POWER TOOL HAVING A BEARING ARRANGEMENT

This application claims priority based on an International Application filed under the Patent Cooperation Treaty, PCT/EP2018/079490, filed Oct. 26, 2018, which claims priority to DE 102017125664.4, filed Nov. 2, 2017 and to DE 102017126486.8, filed Nov. 10, 2017.

BACKGROUND OF THE INVENTION

The invention relates to a hand-held power tool for machining a workpiece, comprising a drive motor, a tool holder, which can be driven by the drive motor, and which is for a working tool for machining the workpiece, and a guide element having a guide surface for guiding the hand-held power tool on the workpiece in a working direction, wherein the tool holder is mounted via a bearing arrangement such that it moves relative to the guide element and said tool holder can be driven by a servo motor arrangement, wherein the hand-held power tool can be swivelled via the bearing arrangement about at least one adjusting swivel axis passing through the guide surface at an angle, in particular at a right angle, for the relative adjustment of the tool holder relative to the guide element, wherein the hand-held power tool has a control device for controlling the servo motor arrangement.

Such a hand-held power tool is described in US 2015/0094836 A1. The hand-held power tool is a router that shows the operator the working area on the image, so to speak, wherein the operator themselves provides the feed motion. The operator guides the hand-held power tool along the surface of the workpiece, wherein the bearing arrangement and the servo motor arrangement control the tool holder to follow a working line or working area to machine the workpiece, such as to make a milling groove. The bearing arrangement comprises controlling kinematics with two eccentric bearings, but is not suitable for all types of hand-held power tools.

To solve the task, in a hand-held power tool of the type mentioned above, the control device for actuating the servo motor arrangement is designed in such a way that the servo motor arrangement adjusts the tool holder with respect to the guide element while maintaining a pivot position with respect to the adjusting swivel axis with a direction of motion component parallel to the guide surface of the guide element with respect to the guide element.

The control device has, for example, a control arrangement or control for such control of the servo motor arrangement.

It is expedient for the hand-held power tool to have one or more operating handles for an operator to grasp. It is preferably provided that the hand-held power tool has at least one operating handle for adjusting the guide element in the working direction or against the working direction, wherein the servo motor arrangement and the bearing arrangement are arranged between the tool holder and the at least one operating handle. For example, the at least one operating handle is located on the guide element. The at least one operating handle comprises for example a handle, a handling projection, an operating surface or the like. The bearing arrangement and the servo motor arrangement position the tool holder relative to the operating handle in order to keep the working tool in the correct position relative to the working area, in particular relative to a working line. The operator, on the other hand, ensures that the working tool is fed along the working direction or against the working direction. Thus, the operator moves the working tool back and forth in the working direction, as it were, by exerting force on the hand-held power tool at the at least one operating handle, while the servo motor arrangement and the bearing arrangement position the working tool.

SUMMARY OF THE INVENTION

It is a basic principle of the present invention that the control device together with the servo motor arrangement and the bearing arrangement ensure that the tool holder is not only adjusted with respect to its working angle, i.e. assumes a different angle of adjustment with respect to the guide element, but rather that the tool holder is additionally adjusted with respect to the guide element with at least one direction of motion component parallel to the guide surface, while maintaining a respective pivot position around the adjustment swivel axis. This adjustment is therefore a translational or shifting adjustment. The degree of freedom of movement of the movement direction component is therefore a translational or shifting degree of freedom of movement. Thus, for example, a kind of parallel adjustment of the tool holder can be set or controlled by the control device while maintaining the angle of adjustment. Thus, for example, if the operator adjusts the guide element, e.g. a saw bench or similar other guide element, transversely to the actual direction of motion, e.g. at right angles transversely or obliquely transversely, the control device controls the servo motor arrangement for adjustment of the tool holder parallel to the guide element in such a way that the angularity of the working tool relative to a working line remains the same not only at the incision area in the working tool but also in the extension thereof and/or relative to a working length of the working tool which is in engagement with the tool.

For example, a saw blade or similar other cutting blade suitable as a working tool can be adjusted by the control device and the control motor arrangement in such a way that the angularity of the entire blade relative to an e.g. straight working line and/or relative to a length of the working tool currently engaging or dipping into the workpiece is maintained.

The control device controls the servo motor arrangement advantageously in such a way that the working tool maintains its position, namely its angular position and/or longitudinal position, relative to a longitudinal length with which it cuts into the workpiece, even if the guide element is adjusted relative to the tool holder by the operator.

It is expedient for the working tool to have a front penetration area for penetration of the workpiece relative to the working direction. The penetration area includes, for example, a tooth arrangement or other cutting edge that cuts into the workpiece. The control device is designed to control the servo motor arrangement in such a way that the penetration area maintains a relative position relative to the working direction during a swivel movement of the tool holder about the adjusting axis and/or a movement with the movement direction component parallel to the guide surface of the guide element. Consequently, this measure ensures that the penetration area of the working tool does not move any feed motion in the direction of work, if the servo motor arrangement, as it were, corrects an unsuitable or undesired movement of the guide element by adjusting the guide element and the tool holder relatively about the adjusting swivel axis or by driving relatively with the movement direction component parallel to the guide surface of the guide element. In this connection, it is expedient that the penetration area only undergoes a feed motion or also a negative feed motion, as it were, i.e. a retraction or a return movement against the working direction, if the operator actually specifies this by a corresponding operating action on the guide element by moving the guide element forwards or backwards relative to the working direction. Thus, if the operator does not actuate the guide element forwards or backwards in the working direction, the penetration area of the working tool into the workpiece remains in place, as it were, while the actuation of the control device causes the servo motor arrangement to adjust the guide element and the tool holder relative to each other relative to the angle of adjustment relative to the adjusting swivel axis and/or relative to the movement direction component parallel to the guide surface of the guide element.

The control device is advantageously configured to adjust the tool holder relative to the guide element in such a way that the tool holder maintains its angular position relative to the, for example, linear working direction when the guide element is adjusted relative to the tool holder transversely to the working direction and/or at an angle to the working direction. The tool holder itself is therefore held in the correct position even if the guide element is adjusted by the operator, but this does not correspond to the "desired" working direction.

The control device is expediently configured to adjust the tool holder relative to the guide element in such a way that the tool holder maintains its relative position relative to an at least two-dimensional, preferably three-dimensional, coordinates system which is independent of a workpiece marker provided on the workpiece. For example, the coordinates system is provided by coordinates sensors that send corresponding reference information. Thus, the control device ensures that the tool holder is aligned relative to this external coordinates system, so to speak. An operating action of the operator in that they adjust the guide element, for example transversely to the working direction or set it at an angle, which in itself does not make sense, is corrected automatically, so to speak, by the control device.

The adjusting swivel axis can be a fixed axis relative to the guide element. For example, there is a corresponding swivel bearing between the guide element and the tool holder, which encloses or defines the adjusting swivel axis.

However, it is preferable that the adjusting swivel axis is not stationary relative to the guide element. For example, the adjusting swivel axis can be linearly adjustable and/or swivel about another swivel axis.

The servo motor arrangement may comprise several servo motors, for example a first and a second servo motor or at least a second servo motor. It is advantageous, for example, if the servo motor arrangement has only two, namely a first and a second servo motor.

One embodiment may provide that the servo motor arrangement comprises only linear drives, for example a first and a second linear drive. However, it is also possible that the servo motor arrangement has or comprises one or more rotary drives or combinations of rotary drives and linear drives.

The servo motor arrangement and/or the bearing arrangement are advantageously arranged within or above a projection surface of the guide element on the workpiece to be machined. The advantage of this is that the servo motor arrangement does not, so to speak, project laterally beyond the projection surface of the guide element, or only to an insignificant extent. In particular, it is preferable if the servo motor arrangement and/or the bearing arrangement are arranged completely within or above the projection surface of the guide element.

One embodiment of the invention may advantageously provide that the servo motor arrangement and/or the bearing arrangement does not project laterally in front of the guide surface of the guide element. The advantage of this design is that the bearing arrangement or the servo motor arrangement does not interfere with the operation, i.e. the operator can, for example, guide the guide element along the workpiece without a component of the servo motor arrangement or bearing arrangement getting stuck on an obstacle, so to speak.

Bearing concepts in which linear bearings are provided are explained below. A linear bearing could also be described as a sliding bearing that allows an exclusively translational sliding movement or a sliding movement along a linear displacement path.

The bearing arrangement should expediently have a first linear bearing and at least one second linear bearing. It is also possible that only a first and a second linear bearing or at least one further linear bearing is provided.

A respective linear bearing is used for linear adjustment of the tool holder relative to the guide element, in particular for linear adjustment of the tool holder transverse to the working direction. It is also possible for a linear bearing to extend essentially along the working direction.

The first and second linear bearings have adjusting axes that are parallel to each other. The bearing axes of the linear bearings can be parallel to each other in at least one position of the linear bearings. The adjusting axes can also be essentially parallel to each other, i.e. slightly inclined at an angle of 0° to 5°, for example. A linear bearing can, for example, be swivelled so that the bearing axes of the linear bearings are at an angle, in particular a small angle deviating from the parallel position, when the linear bearings are swivelled relative to one another, for example by means of one or more of the rotary bearings described below.

At this point it should be noted that at least one linear bearing can also be swivelled on a swivel bearing or a swivellable bearing receptacle.

However, it is advantageous if at least one linear bearing is stationary relative to a drive unit or the tool holder so that its adjusting axis extends, for example, along the working direction.

On the guide element there are, for example, fixed bearing receptacles for the first and/or the second linear bearing, on which a respective bearing element of the respective linear bearing is linearly displaceably mounted. The bearing element can be a driven component or a passive, so to speak carried component.

It is preferred when a respective bearing element is formed by the final control element of a linear drive, for example. The bearing receptacle can be provided on a stator of a servo motor, for example.

It is advisable for the bearing arrangement to comprise at least two linear bearings whose bearing axes are oriented transverse to the working direction. For example, the bearing axes can run essentially at right angles to the working direction. At this point it should be noted that the bearing axes can also have several angularities transverse to the working direction, e.g. if a respective linear bearing is swivellably mounted on a swivel bearing.

It is preferable if the bearing arrangement has as few degrees of rotational freedom as possible. One embodiment of the invention may provide that the bearing arrangement has a maximum of two, in particular a maximum of three rotary bearings.

One exemplary embodiment shown in the drawing shows that the bearing arrangement has at least or exactly three rotary bearings and at least or exactly two linear bearings, in particular exclusively three rotary bearings and two linear bearings. A linear bearing is preferably mounted rotatably or swivellably on the guide element using one of the rotary bearings.

However, embodiments are possible in which the bearing arrangement has two linear bearings and three rotary bearings or swivel bearings. It is advantageous if one of the swivel bearings or rotary bearings is located between two linear bearings and connects them together. The bearing elements of the linear bearings, for example, are connected to each other in a swivelling manner by the rotary bearing, in particular at their longitudinal end areas.

It is preferred if the bearing arrangement has, relative to the working direction, a bearing arranged in front of the tool holder, for example a rotary bearing and/or at least one linear bearing, and a bearing arranged behind the tool holder relative to the working direction, for example also a rotary bearing and/or a linear bearing. However, it is also possible, for example, for one bearing to be located, so to speak, at the height of the tool holder relative to the working direction, while the other bearing is provided behind or in front of it in the working direction between the guide element and the tool holder.

Furthermore, it is possible that the bearing arrangement has bearings arranged exclusively relative to the working direction in front of or exclusively relative to the working direction behind the tool holder, for example rotary bearings, linear bearings or the like.

It is expedient to mount the tool holder on a drive unit of the hand-held power tool with the drive motor. The drive unit is movably mounted relative to the guide element by means of the bearing arrangement. The servo motor arrangement is advantageously located between the drive unit and the guide element. With this embodiment it is possible that one angle of the tool holder remains the same. In this connection, the relative position of the tool holder and the drive motor is not changed, except for a change in the rotational angle or linear position of the tool holder relative to the drive motor caused by the drive motor.

In the above embodiment as well as in the following embodiment, it is advantageous if a gear, for example a planetary gear, a manual gear, an angle gear or the like, is provided between the drive motor and the tool holder. However, it is also possible for the drive motor to drive the tool holder directly, i.e. without an intermediate gear.

A further embodiment of the invention may provide that the tool holder is adjusted by the servo motor arrangement and the bearing arrangement relative to the guide element, while the drive unit is stationary relative to the guide element. For this purpose, a corresponding rotary coupling or motion coupling between the drive motor and the tool holder is provided, for example, by means of a flexible rotary shaft, an angle gear or the like. A bevel gear would be conceivable, for example.

In an embodiment of the invention, the working tool may, for example, be a milling tool, a grinding tool or the like. Another embodiment of the invention, which is shown in more detail in the drawing, provides that the working tool is or comprises a cutting tool with a flattened shape, for example a saw blade, a cutting disc or the like. Furthermore, the drive motor can, for example, drive a rod-like cutting tool, in particular if the hand-held power tool is configured as a jigsaw.

The drive motor is expediently arranged and/or configured to drive the tool holder in rotation. It would naturally be possible for the drive of the tool holder or the drive motor also to perform an oscillatory drive movement. For example, an oscillating gear can be provided between the tool holder and the drive motor.

The control device is suitably designed to control the servo motor arrangement for parallel adjustment of the cutting tool relative to the guide element in a plane parallel to the flat side of the cutting tool. Thus, for example, the cutting tool can be adjusted parallel to its flat side, wherein the above-mentioned angle of adjustment between the tool holder and the guide element is maintained.

It is preferable if the hand-held power tool has a display device for indicating an adjustment range of the tool holder and/or the working tool arranged on the tool holder, which can be set by the servo motor arrangement transverse to the working direction. For example, the operator can check that the tool holder or working tool is still within an adjustment range that can be adjusted by the servo motor arrangement. If this adjustment range is exceeded, the desired workpiece machining is no longer possible.

Furthermore, it is expedient if the hand-held power tool has a display device for displaying the actual position, set by the servo motor arrangement, of the tool holder and/or of the working tool arranged on the tool holder and/or for displaying a target position to be set of the tool holder and/or of the working tool arranged on the tool holder. In this way, the operator can check that the tool holder or the working tool or both are in the desired actual position. Furthermore, by displaying the target position of the tool holder or working tool, the operator can see which setting the servo motor arrangement will, so to speak, soon execute.

In an expedient embodiment of the invention, the hand-held power tool forms part of the system for machining a workpiece described below and is suitable for use in a process in which the system is used. A marker detection device is provided for detecting coordinate data of at least one workpiece marker of the workpiece. The hand-held power tool has guide means for guiding the working tool along the workpiece according to the coordinate data of the at least one workpiece marker. The system provides that the marker detection device has an optical and/or mechanical reference which can be positioned on and/or directly next to the at least one workpiece marker, that the marker detection device is designed for determining the coordinate data of the at least one workpiece marker relative to an at least two-dimensional coordinates system which is independent from the workpiece marker, and that the guide means of the hand-held power tool is adapted to guide the working tool with respect to the at least two-dimensional coordinates system in a working area which is geometrically defined by working area data determined on the basis of the coordinate data of the at least one workpiece marker.

In this respect, the basic principle is that the mechanical or optical reference is positioned, so to speak, directly on and immediately next to the at least one workpiece marker, so that in this way an exact spatial or local coincidence between the mechanical/optical reference on the one hand and the workpiece marker on the other hand can be achieved. A possible inaccuracy in that an optical system is used which maps the workpiece marker, so to speak, so that the user sets a virtual reference to the mapped workpiece marker is therefore not provided, unlike in the prior art.

The workpiece marker can be a marker that an operator applies to the workpiece, such as a linear marker, a line marker, a dot marker or the like. However, the workpiece marker can also be a natural workpiece marker, so to speak, or a workpiece marker which forms an integral part of the workpiece, for example a workpiece edge, a recess, a coloured marker or contrast marker in a surface coating of the workpiece or the like.

The coordinates system can be two-dimensional or three-dimensional. Therefore, the coordinates system is preferably spatial.

For example, the coordinates system is fixed relative to the working space.

A preferred exemplary embodiment provides that the hand-held power tool and/or the marker detection device and/or a workpiece position detection device explained later has a local coordinates system, in particular a local two-dimensional or three-dimensional coordinates system. At least one of the aforementioned components is designed to convert coordinate data of a geometric object determined in a local coordinates system, for example a point, a line or a surface, into another coordinates system. To this end, the following formulae (1), (2) and (3) are suitable for a rotational transformation.

$$Rx(\alpha) = \begin{pmatrix} 1 & 0 & 0 \\ 0 & \cos\alpha & -\sin\alpha \\ 0 & \sin\alpha & \cos\alpha \end{pmatrix} \quad (1)$$

$$Ry(\beta) = \begin{pmatrix} \cos\beta & 0 & \sin\beta \\ 0 & 1 & 0 \\ -\sin\beta & 0 & \cos\beta \end{pmatrix} \quad (2)$$

$$Rz(\gamma) = \begin{pmatrix} \cos\gamma & -\sin\gamma & 0 \\ \sin\gamma & \cos\gamma & 0 \\ 0 & 0 & 1 \end{pmatrix} \quad (3)$$

For example, a rotation about the X-axis by an angle $\alpha$ can be described with formula (1), a rotation about the Y-axis with the angle $\beta$ can be described with formula (2), and a rotation about the Z-axis with the angle $\gamma$ can be described with formula (3). Naturally, translational transformations are also possible, for which common matrix shifts are known to be suitable.

An alternative concept for calculating a shift operation or translation of points from one coordinates system to another coordinates system, for example from a local coordinates system of the marker detection device or the hand-held power tool to the global coordinates system related to the working space, are so-called quaternions. By means of scalar multiplications of the quaternions, for example, the coordinates systems can be converted into each other, so to speak.

The conversion or transfer of the coordinates systems can be performed by the respective control devices or monitoring devices of the marker detection device, the hand-held power tool, in particular the guide means, or a workpiece detection device which can be attached to the workpiece, for example.

At least one component of the system, which is formed by the hand-held power tool, for example its control device, and/or by the marker detection device and/or by a workpiece position detection device positioned or positionable on the workpiece, is advantageously configured for a translation and/or conversion of coordinate data of at least one point from a local, in particular two-dimensional or three-dimensional, coordinates system relative to the respective component into the at least two-dimensional, in particular stationary, coordinates system and/or vice versa relative to the working space.

The coordinates system can be located directly on the workpiece, for example by a marker strip with a geometric pattern.

It is preferable to provide the at least two-dimensional, preferably three-dimensional, coordinates system by means of at least one coordinates sensor which can be placed in a working space in which the workpiece is arranged. The guide means and/or the marker detection device are designed to determine the position of the at least one coordinates sensor and/or to determine at least one piece of reference information transmitted by the at least one coordinates sensor. The coordinates sensor can thus be arranged stationary, in a manner of speaking, at a predetermined position in the working space and/or on the workpiece, which is then detected by the marker detection device and preferably later also by the guide means when the workpiece is being machined.

The at least one coordinates sensor can be a so-called passive coordinates sensor, whose spatial position can be detected by the marker detection device and/or the guide means. For example, the marker detection device or the guide means detects a geometric contour and/or a color and/or a contrast, for example a bar code, on the at least one coordinates sensor.

The coordinates sensor can also be an active coordinates sensor that sends reference information. The reference information is for example optical information, such as light pulses, light waves or the like. In particular, physical waves, microwaves or the like are preferably provided as reference information.

The at least one coordinates sensor may have fastening means, such as adhesive fastening means, hook fastening means and/or suction fastening means, for attachment to the workpiece or a substrate, or both. Thus, the coordinates sensor can be fixed, so to speak. Furthermore, it is advantageous if the coordinates sensor has at least one utility surface for placement on a base or the workpiece or both. Preferably, a system with several, for example two, coordinates sensors is preferred. This enables a particularly favorable geometric configuration. The various coordinates sensors may be spaced so that the guide means or the marker detection device, or both, always have at least one coordinates sensor in their detection area. Furthermore, geometric methods for determining the two-dimensional or three-dimensional coordinates system, e.g. triangulation or the like, can also be used with several coordinates sensors.

The at least one coordinates sensor is expediently designed to transmit reference information in mutually angular directions and/or in mutually parallel planes. The marker detection device or guide means is designed to detect this reference information. This means that the marker detection device can make optimum use of the reference information. The directions that are at an angle to each other are preferably at right angles. For example, the coordinates sensor can transmit in parallel planes in a first direction and in a direction angled to the first direction. For example, a kind of stripe structure can be sent. The stripe patterns can be sent at an angle to each other, so that in principle a grid structure is specified by the coordinates sensor, wherein the individual grid lines can be sent simultaneously or consecutively.

It is also possible that the system works without such a coordinates sensor. For example, it may be provided that the guide means of the hand-held power tool or the marker detection device or both have orientation means for orientation relative to the at least two-dimensional coordinates system in a working space in which the workpiece is located.

The orientation means are designed to detect geometric contours of the working space, for example walls, room corners, inner room edges or the like. It is also advantageous if the orientation means are designed to receive reference information characterising the position of the hand-held power tool or marker detection device or the workpiece in the working space. For example, the orientation means can be used to record the reference information mentioned above.

The marker detection device is preferably designed to detect the coordinate data of the at least one workpiece marker after the reference has been positioned relative to the workpiece marker according to at least one triggering condition. This means that the operator can, for example, position the optical or mechanical reference first relative to, for example, at least one workpiece marker or the respective workpiece markers. The marker detection device then records the coordinate data of the at least one workpiece marker according to at least one triggering condition.

There are various possible triggering conditions, which may also be in combination with each other. Below are some exemplary possibilities:

For example, a sensor may be provided on the marker detection device and/or the guide means which can detect an operator action such as a wiping movement, pressure or the like. The sensor can be an optical sensor, a capacitive sensor, an inductive sensor or similar. It is also possible that the controlling action by an electrical switch provided on the marker detection device or guide means or hand-held power tool is detected by the marker detection device or guide means.

Furthermore, a time condition, e.g. a dwell time of the reference of at least one workpiece marker for a predetermined time, is possible. The time condition can mean, for example, that the marker detection device is not moved relative to the workpiece marker for a predetermined time. A relative movement or even the lack of a relative movement can be determined by the marker detection device, for example by means of a distance measurement or an optical detection of the workpiece marker for a predetermined time, but also by means of the motion sensor explained below.

It is possible that the marker detection device has a motion sensor. If there is no movement of the marker detection device for a predetermined time, this is considered to be a detection of the workpiece marker.

In addition, the marker detection device and/or the guide means may comprise or include a distance sensor enabling the detection of a distance between the reference and the at least one workpiece marker. If a predetermined limit distance between the reference and the at least one workpiece marker is undershot, i.e. a limit distance is maintained, the workpiece marker is considered to be detected.

Furthermore, a dynamic detection of the workpiece marker is also possible. For example, the marker detection device can be moved over the workpiece marker and visually detect it. Optical detection includes, for example, a light-dark contrast between the workpiece marker and a background or surface of the workpiece.

Furthermore, it is advantageous if the marker detection device is designed for tactical and/or optical selection of the at least one workpiece marker. For example, the marker detection device may have a mechanical reference in the form of an arrow marker, a line marker or the like. The mechanical reference can also be provided to the hand-held power tool, for example by a side edge of the guide element, such as a guide carriage or guide bench. In terms of optical selection, for example, a directed light beam is possible. For example, a light source, in particular a laser or the like, may be provided on board the marker detection device. If this laser or other light source is directed at and coincides with the workpiece marker, the workpiece marker is considered to be detected. For example, an operator action is also useful for this purpose, i.e. the operator presses a key on the marker detection device to activate the coincidence between the optical reference, in particular the light beam, and the workpiece marker as a triggering condition for coordinate detection. This has already been explained above in connection with the advantageous triggering condition.

The following measure represents an intrinsically independent invention, but it can also be an advantageous embodiment of the above invention. The marker detection device may be a component which is separate or can be separated from the hand-held power tool.

In particular, the marker detection device is much lighter than the hand-held power tool. For example, it is only about 10-20% of the weight of the hand-held power tool.

Furthermore, it is advantageous if the marker detection device has a smaller spatial extent than the hand-held power tool, for example only 10-20% of the spatial extent of the hand-held power tool in at least one dimension, for example a transverse width, transverse length or the like, or in several dimensions. For example, the marker detection device can be significantly smaller than the hand-held power tool in two dimensions, in particular in cross-section. However, it is possible that it may also have approximately the same length or height as the hand-held power tool, for example if the marker detection device is pin-shaped or rod-shaped.

It is also possible for the marker detection device to form part of the power tool, for example by placing the reference on the guide element. The determination of the coordinate data in connection with the selection of the workpiece marker can also be performed directly by the hand-held power tool if it has the marker detection device on board.

The hand-held power tool expediently has a wired or wireless interface, or both, for the marker detection device. The marker detection device can transmit the coordinate data of at least one workpiece marker to the hand-held power tool via the respective interface, for example via Bluetooth, WLAN or the like. However, a wired transmission of these coordinate data is also possible, for example by means of serial data, bus data or the like. In particular, the provision of a bus interface or a bus transmission with a digital protocol, for example via Bluetooth, an I2C bus or similar, between the marker detection device and the hand-held power tool is possible.

The hand-held power tool may have a holding fixture for holding the marker detection device. For example, a pocket, recess or other similar holding fixture may be provided for the marker detection device. However, it is also possible that the hand-held power tool has a clamp or other similar support or holding fixture for the marker detection device. The holding fixture is provided for example on a machine housing of the hand-held power tool. For example, the machine housing accommodates the drive motor and the tool holder. The holding fixture can also be provided on the guide element.

The marker detection device is expediently motorless or has no drive motor to drive a working tool. Consequently, the marker detection device is, so to speak, a manually actuated or manually operated device, while the motor component of the system is provided by the hand-held power tool. A drive motor is comparatively heavy, which determines the weight of the hand-held power tool. The marker detection device, on the other hand, can form or have a light and therefore easily manageable unit.

When detecting the workpiece marker, it is in any case advantageous if the marker detection device is not or cannot be motor-driven. For example, the hand-held power tool itself may have or display the marker detection device. However, operation of the hand-held power tool is not provided, at least during the detection of the workpiece marker. It may be advantageously provided that the hand-held power tool blocks operation of the drive motor when detecting the workpiece marker. In any case, vibrations or similar other influences of the drive motor do not interfere if the marker detection device is not motor-driven at least during the detection of the at least one workpiece marker.

The marker detection device may include a pin or be pin-shaped. Therefore, the detection device is preferably designed in the manner of a pointing device. The reference is preferably formed by a tip or longitudinal end of the pin or pin-shaped marker device.

It is also possible that the marker detection device has an optical light source to provide the optical reference, such as a laser beam. In this context it is also advantageous if a distance measurement is provided. If, for example, the optical light source does not exceed a specified limit distance to the workpiece marker, the detection of the coordinates or coordinate data is enabled, so to speak. The light source must therefore be close to the workpiece marker so that the coordinate detection is actively switched relative to the at least two-dimensional coordinates system.

It is possible that the guide means actively guides the tool holder, so to speak, or even output only auxiliary information for the operator for optimum guiding of the tool holder and thus of the working tool.

For example, the guide means may include an output device for the visual and/or audible output to the operator of default information concerning or defining the working area, such as a target working line. The working area can also have a spatial shape such that it defines a work surface, for example. This work surface or working area can also be displayed on the output device. The output device is, for example, a display, in particular an LCD display, a graphics-capable display or the like.

The guide means advantageously comprise a servo motor arrangement with at least one servo motor for adjusting a relative position of the tool holder relative to the guide element. The at least one servo motor is for example an electric motor, a pneumatic drive or the like. Consequently, the guide means can, so to speak, adjust the tool holder, in particular the drive motor including the tool holder, relative to the guide element, so that the tool holder and thus the working tool follow a target working line or a target working area, so to speak. This means that the working area is automatically maintained or regulated, so to speak.

As already mentioned, the working area preferably comprises a working line along which the working tool is to be guided relative to the workpiece. It is also possible that the working area includes or is formed by a machining area of the workpiece intended for machining the workpiece.

It is preferable if the guide means and/or the marker detection device is designed to determine the working area data of the working area, for example to an at least sectionally straight working line or a complete working line extending between the workpiece markers, on the basis of coordinate data, related to the at least two-dimensional coordinates system, of at least two workpiece markers arranged at a distance from each other. For example, two line markers or dot markers can be provided on the workpiece.

The marker detection device or the guide means can evaluate their position, so to speak, relative to the two-dimensional coordinates system and determine a working line from this. If several such workpiece markers are present, an interpolation is preferably possible in order to create a virtual straight working line. However, it is also possible for several workpiece markers to be read in, as it were, or for their coordinate data to be determined by the marker detection device in order subsequently to determine, for example, a working line or the like having angular sections and/or curvatures and/or curved lines by the guide means or the marker detection device. The system is therefore capable of determining the working area data itself, so to speak.

The guide means or the marker detection device, or both, may expediently have a receiving interface for receiving default data defining the working area, such as a working line. For example, a USB interface, a WLAN interface, a Bluetooth interface or the like is provided as a receiving interface to receive such default data. The default data is received, for example, from a CAD device, a computer or the like. Furthermore, the guide means and/or the marker detection device are designed to determine the working area data of the working area according to the default data. For example, the guide means or the marker detection device align the working area as a function of the at least one detected workpiece marker and/or define a starting point for the working area.

It is preferable if the system for the detection of a respective position of the marker detection device and/or the hand-held power tool comprises at least one coordinate detection device which can be placed in the working space in which the workpiece is arranged and which forms an assembly unit separate from the hand-held power tool or the reference of the marker detection device. The coordinate detection device may, for example, be an arrangement of one or more cameras, in particular a stereo camera or a plurality of stereo cameras. The coordinate detection device detects, so to speak, the position of the reference to be aligned with the workpiece marker or the hand-held power tool or both. For example, the coordinate detection device can form part of the marker detection device.

In the above scenarios, it has primarily been assumed that the workpiece remains in place after the workpiece marker or markers have been detected, i.e. the spatial or local position of the workpiece relative to the two-dimensional or three-dimensional coordinates system is maintained. The coordinate data of at least one workpiece marker therefore remain unchanged until the workpiece is processed.

However, the above measures can also be applied in connection with the subsequent embodiment of the invention, in which the workpiece does not have to remain stationary after the detection of the at least one workpiece marker, but is moved before the workpiece is machined, for example, is turned around, is moved to a more favourable machining location or the like.

Specifically, the system expediently includes a tracking means for tracking a movement of the workpiece after the detection of the at least one workpiece marker by the marker detection device up to a machining position intended for the machining of the workpiece by the hand-held power tool. The tracking means are designed to provide tracking data characterising this movement or the machining position, so that the guide means of the hand-held power tool guide or can guide the working tool on the basis of working area data determined from the coordinate data of at least one workpiece marker and the tracking data. For example, a translation of the coordinate data of at least one workpiece marker can be carried out using the tracking data, so that a new position of the workpiece marker can be determined, comprising transformed coordinate data, so to speak. The coordinate data of the workpiece marker are thus, so to speak, converted or further tracked according to the new position of the workpiece relative to the at least two-dimensional coordinates system.

The tracking can now be performed, for example, using the above-mentioned coordinate detection device, for example a stereo camera, which can be placed in the working space. This can, for example, record the position of the workpiece present when the at least one workpiece marker is detected and then a position of the workpiece relative to the at least two-dimensional coordinates system assumed before machining by the hand-held power tool.

However, the following measure is particularly convenient, in which it is provided that these comprise at least one workpiece position detection device and/or workpiece position reference marker attached to the workpiece after detection of the at least one workpiece marker and at least until reaching the machining position. The workpiece position detection device can be an active component which, for example, also detects the reference information of one or a plurality of coordinates sensors mentioned above. However, it is also possible that a workpiece position reference marker, for example a workpiece marker or similar other marker is attached to the workpiece, which is, so to speak, tracked by the tracking means. For example, in one scenario, the workpiece position reference marker is a workpiece edge of the workpiece that serves as the workpiece position reference marker. However, a workpiece position reference marker may also be provided which includes adhesive means, such as suction means, adhesives or the like, for attachment to the workpiece. This workpiece position reference marker has, for example, a colour contrast, light-dark contrast or the like, which can be detected by the tracking means.

It is also possible that a plurality of device reference markers and/or sensors for determining the orientation in the at least two-dimensional coordinates system are expediently arranged on the marker detection device and/or the hand-held power tool and/or the workpiece position detection device already mentioned. The device reference markers can, for example, be detected by a camera located in the working space.

The following measure contributes to a geometrically exact determination of coordinates. At least two device reference markers or at least two sensors for determining the orientation in the at least two-dimensional coordinates system are arranged on the marker detection device and/or the hand-held power tool at extremities or end regions or both of the respective marker detection device or hand-held power tool which are remote from one another. Furthermore, it is advantageous if the distance of the device reference markers or sensors corresponds to at least two thirds or at least half of a respective extension length of the hand-held power tool or the marker detection device. Thus, for example, if a machine has a height H, the sensors or device reference markers are positioned at a distance relative to this height that corresponds to half the height or one third of the height.

BRIEF DESCRIPTION OF THE DRAWINGS

Exemplary embodiments of the invention are explained below using the drawing, wherein:

FIG. 1 shows a perspective oblique view comprising a system with a hand-held power tool as well as two coordinates sensors and a workpiece prior to workpiece machining, FIG. 2 shows the system as shown in FIG. 1, but during workpiece machining by the hand-held power tool, FIG. 3 shows a detail view of a coordinates sensor of the system as shown in FIG. 1, FIG. 9 shows a further embodiment of a hand-held power tool with a different bearing concept and a different servo motor arrangement, in a basic position, FIG. 10 shows the hand-held power tool as shown in FIG. 9 in a first adjusting position, FIG. 11 shows the hand-held power tool as shown in FIGS. 9 and 10 in a second adjusting position, FIG. 12 shows a further bearing arrangement and servo motor arrangement of a hand-held power tool in a schematic representation, FIG. 13 shows the control device of the hand-held power tools as shown in the above drawings in schematic representation, FIG. 16 shows a schematic representation of a marker detection device as shown in FIG. 1.

DETAILED DESCRIPTION

Figure 4:
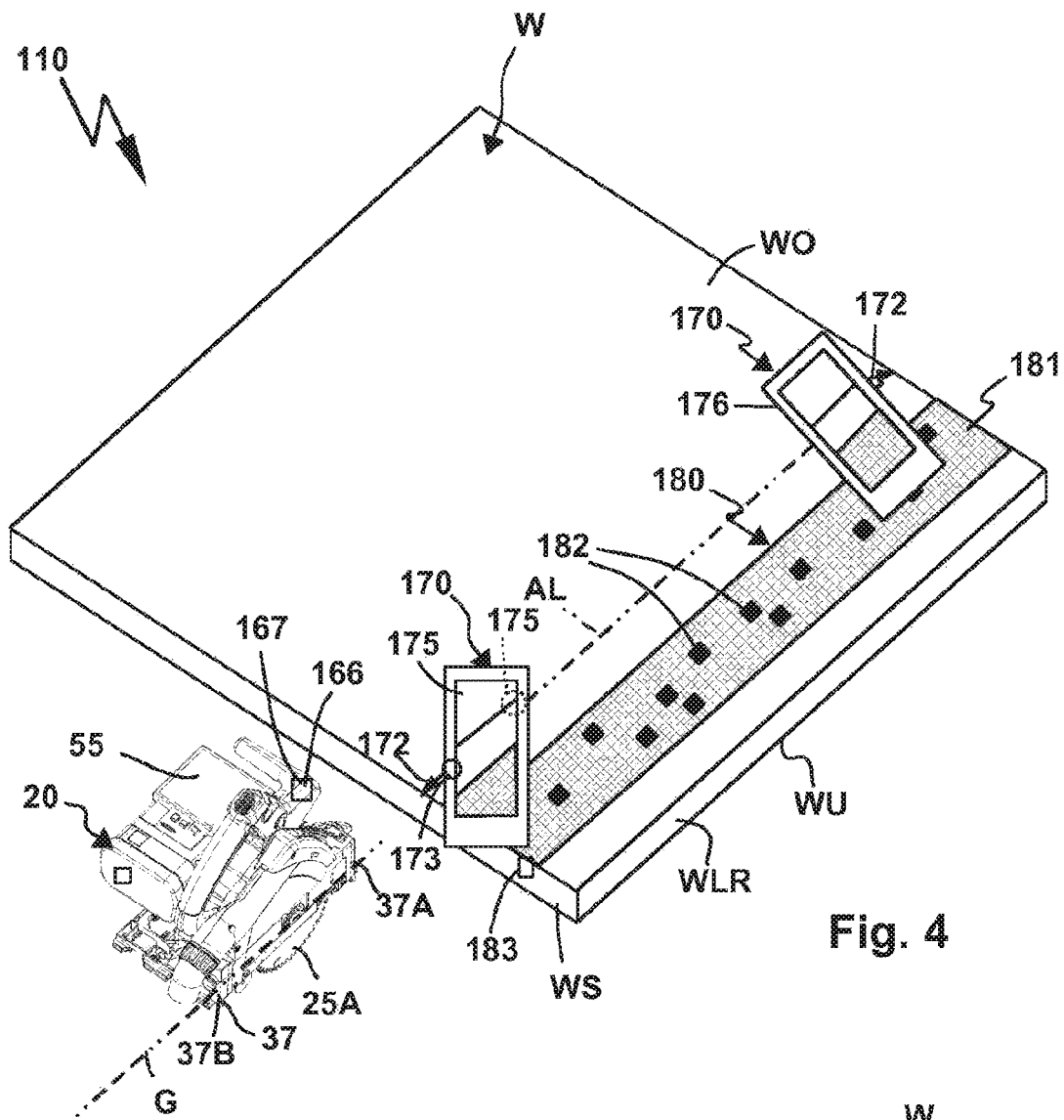
FIG. 4 shows another system with marker detection devices that have a display and a reference marker.

A hand-held power tool 20 of a system as shown in FIG. 1 has a machine housing 21 which houses a drive motor 22. The drive motor 22 can be switched on and off by a switch 23. An operator may press the switch 23, for example. The drive motor 22 is used to drive a tool holder 24 so that it rotates about an axis of rotation D. A gear 22A can be provided between the drive motor 22 and the tool holder 24.

The working tool 25 can be detachably attached to the tool holder 24, for example by means of a screw, a bayonet joint or the like. The working tool 25 is in this case a cutting tool 25A. The working tool 25 has a disc-like or leaf-like shape. For example, the working tool 25 is a saw blade.

The hand-held power tool 20 is a sawing machine, in particular a plunge sawing machine or the like. The hand-held power tool 20 is preferably intended for woodworking, wherein other materials can also be machined, such as plastics, metal or the like.

The working tool 25 is arranged so to speak on one longitudinal side of the hand-held power tool 20. Its flat side 26 is essentially free standing, so that with the hand-held power tool 20 it is possible to saw close to the edge, so to speak.

The hand-held power tool 20 is an electric hand-held power tool, wherein the concept according to the invention is also applicable to hand-held power tools with pneumatic drives, i.e. pneumatic drives for the tool holder and thus the working tool.

For the electrical power supply of the hand-held power tool 20, a power supply cable 28A can be provided (FIG. 2) with which the hand-held power tool 20 can be connected to a power supply network, for example an alternating current network. For example, a power plug 28B is provided on the power supply cable 28A for plugging into a power outlet. However, a more mobile or off-grid concept is preferred, in which the hand-held power tool 20 already has an on-board energy storage device 28, for example a battery pack or similar.

The drive motor 22, if applicable the gear 22A, and the working tool 25 are components of a drive unit 29 of the hand-held power tool 20. An interface for the energy storage device 28 is arranged on this drive unit 29, i.e. the energy storage device 28 is arranged on the drive unit 29. However, a so-called guide bench or guide plate could also be arranged on the guide element 30 explained below, for example.

The guide element 30 has a guide surface 31 on its side facing away from the drive unit 29, in particular the underside, which can be guided along a workpiece W, for example its upper side. The guide surface 31 is a flat surface in this case. However, for a hand-held power tool according to the invention, a non-planar guide surface, such as a curved or bent guide surface, may also be provided.

In this case, the guide element 30 is plate-like or has a guide plate or is designed as such. For example, the guide element 30 is substantially rectangular. The guide element 30 has a front transverse side 32 in the working direction, a rear transverse side 33 in the working direction and longitudinal sides 34 and 35 extending between these transverse sides 32, 33. The working tool 25 is arranged in the area of the right longitudinal side 35 in the working direction and projects downwards in front of the guide surface 31 in at least one depth adjusting position which is suitable for machining the workpiece W.

The drive unit 29 is adjustably mounted relative to the guide element 30 by means of a bearing arrangement 40. This means that the tool holder 24, and if necessary the working tool 25, are also mounted so that they can be adjusted relative to the guide element 30 by means of the bearing arrangement 40, e.g. swivellable, slidable or both.

At this point it should be noted that the drive motor 22, possibly a gear, are components of the drive unit 29, which as a whole is adjustably mounted relative to the guide element 30 by means of the bearing arrangement 40. However, if the drive motor 22 was fixed to the guide element 30, the power of the drive motor 22 could be transmitted to the tool holder 24 by means of a power transmission device, for example a flexible shaft.

The bearing arrangement 40 comprises a depth adjustment bearing 36, with which the tool holder 24 is mounted so that it can be adjusted between at least two deep adjusting positions relative to the guide surface 31. In the present case, the depth adjustment bearing 36 comprises, for example, a swivel bearing at the front or rear in the working direction. For example, the hand-held power tool 20 is designed in the manner of a plunge saw. When the tool holder 24 is adjusted by swivelling the drive unit 29 about a depth adjusting axis T of the depth adjustment bearing 36, the tool holder 24 can, for example, be adjusted from an upper depth adjusting position in which the working tool 25 does not project in front of the guide surface 31, and at least one lower depth adjusting position, preferably several lower depth adjusting positions, in which the working tool 25 projects in front of the guide surface 31 to machine the workpiece W. Instead of a swivel bearing, however, a sliding bearing or sliding bearing arrangement could also be provided to provide the depth adjustment bearing 36.

Furthermore, it is possible to swivel the tool holder 24 and thus the working tool 25, which may be located on the tool holder 24, about a mitre axis G which extends parallel to the working direction AR and/or parallel to the longitudinal side 35 of the guide element 30. Thus, diagonal cuts into the workpiece B are possible without any problems. The mitre bearing 37 comprises for example two partial mitre bearings 37A, 37B, which are arranged in the working direction AR in front of and behind the tool holder 24, in particular the working tool 25. The depth adjustment bearing 36 and the mitre bearing 37 can be operated manually. For example, in a manner known per se, they comprise fixing elements which are released in order to adjust the drive unit 29 relative to the depth adjusting axis T and/or the mitre axis G relative to the guide element 30.

Figure 6:
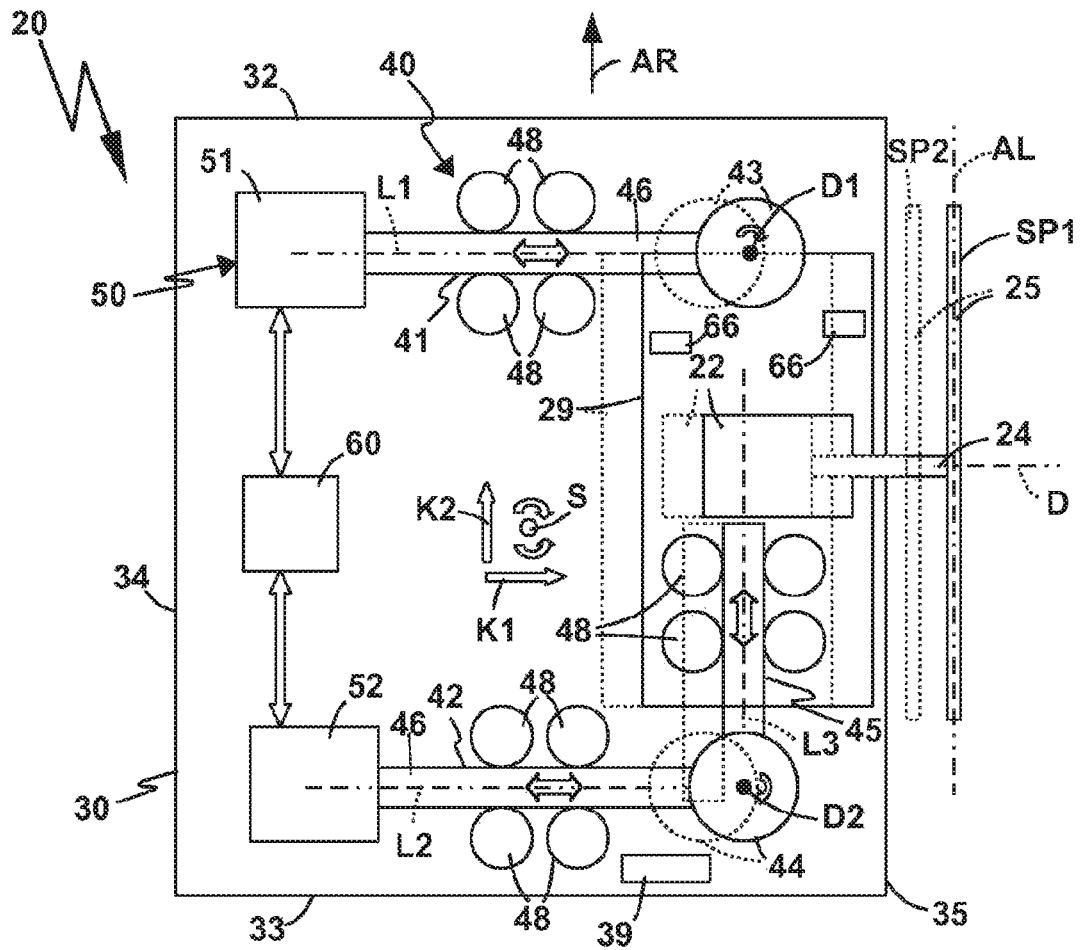
FIG. 6 shows a schematic top view of movement kinematics of a hand-held power tool of the type shown in FIGS. 1, 2 and 4 with a first servo motor arrangement and a first bearing arrangement.
Figures 7, 8:
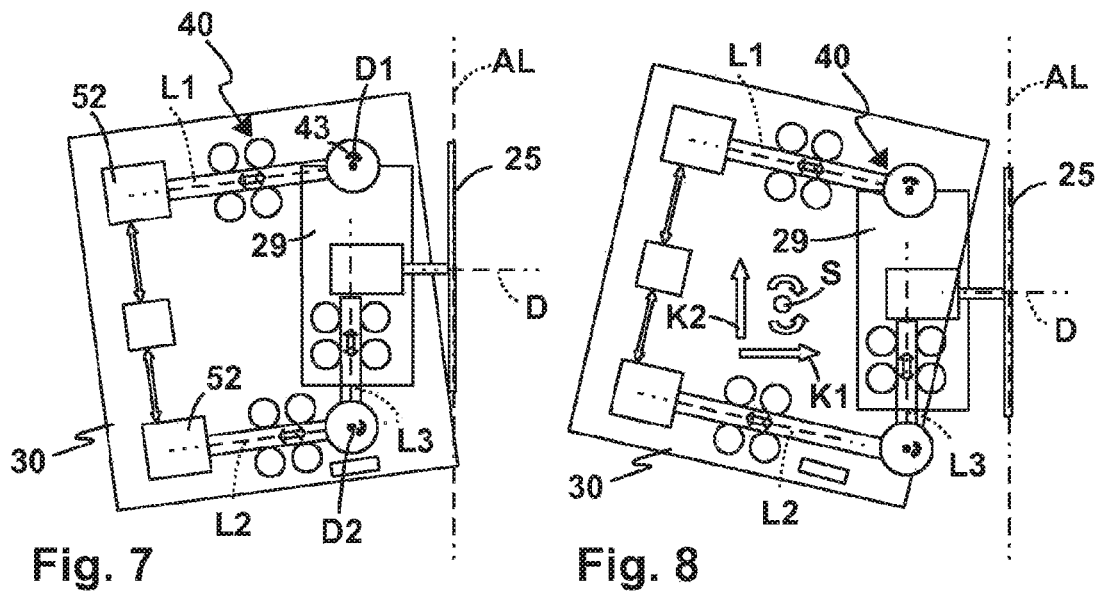
FIG. 7 shows the hand-held power tool as shown in FIG. 6 in a first relative position of the tool holder and guide element.
FIG. 8 shows the hand-held power tool as shown in FIGS. 6 and 7 in a second relative position of the tool holder and guide element.

The bearing arrangement 40, however, still includes bearings that cannot be adjusted by hand but by motor. In this connection, various bearing concepts are shown in FIGS. 6 to 12, which are explained below as examples:

A bearing arrangement 40 in the embodiment shown in FIGS. 6, 7 and 8 comprises, for example, linear bearings 41, 42, which are arranged in the working direction AR in front of and behind the tool holder 24. Linear bearings 41, 42 are coupled to the drive unit 29 using swivel bearings 43, 44. The rotary bearing 43 is directly coupled to the drive unit 29, for example by means of the machine housing 21. The rotary bearing 44 on the other hand is coupled to the drive unit 29 by means of a further linear bearing 45. The rotary bearings 43, 44 have axes of rotation D1 and D2.

The linear bearings 41, 42 each have a bearing element 46, which is mounted for linear movement on a bearing receptacle 47, in the linear bearing 41 along an adjusting axis L1, in the linear bearing 42 along an adjusting axis L2.

The bearing receptacles 47 comprise rotatable bearing blocks or rollers 48, between which the rod-shaped or bar-shaped bearing elements 46 are accommodated. Naturally, a guide groove, a sliding support or similar linear bearing contour could also be provided as a bearing receptacle 47. The drawing here is to be understood as an example.

The bearing element 46 of the linear bearing 42 is rotatably coupled to a bearing element 46 of the linear bearing 45 using the rotary bearing 44. The rotary bearing 44 is provided at the respective longitudinal end areas or free end areas of the bearing elements 46 of the linear bearings 42, 45 and swivellably couples the bearing elements 46.

The linear bearing 45 supports its bearing element 46 for sliding motion along an adjusting axis L3. The bearing axis L3 is essentially parallel to the working direction AR, but can change its orientation or angle relative to the working direction AR, which is made clearer below.

A relative position of the tool holder 24 relative to the guide element 30 can be adjusted by means of the bearing arrangement 40 both about an adjusting swivel axis S and transversely thereto, namely with a movement component K1, which runs substantially parallel to the axis of rotation D of the tool holder 24 and/or transversely to the working direction AR, and advantageously with a movement direction component K2, which is aligned along the working direction AR and/or at right angles to the axis of rotation D of the tool holder 24. The adjusting swivel axis S passes through the guide surface 31 at an angle, in particular orthogonally.

Essentially, the bearing arrangement 40 is configured in such a way that a control device 60 can control a servo motor arrangement 50 with servo motors 51, 52 in such a way that the tool holder 24 and thus the working tool 25 retain their orientation relative to the working direction AR and/or relative to a target working line AL along which working tool 25 is to come into engagement with the workpiece W, for example to make a saw cut.

The servo motors 51, 52 are assigned to linear bearings 41, 42. For example, the servo motors 51, 52 drive the bearing elements 46 of the linear bearings 41, 42. It is possible that the bearing elements 46, for example, are formed by the output drives of the servo motors 51, 52. It is therefore possible that the linear bearings 41, 42 are components of the servo motors 51, 52.

If the control device 60 controls the servo motors 51, 52 for a simultaneous and equally fast advance of the bearing elements 46 of the linear bearings 41, 42, an angle of the tool holder 24 relative to the adjusting swivel axis S is maintained. This will, for example, displace the working tool 25 in parallel between an adjusting position SP1 shown in solid lines in FIG. 6 and an adjusting position SP2 shown in dashed lines in FIG. 6. Naturally, such parallel adjustment is not only possible if the longitudinal side 35 of the guide element 30 runs parallel to the working line AL, but also swivel positions of the guide element 30 relative to the axis of rotation D and/or the flat side 26 of the working tool 25 as shown in FIGS. 7 and 8.

However, the servo motor arrangement 50 can also be controlled by the control device 60 in such a way that the axis of rotation D changes its swivel position relative to the adjusting swivel axis S, in particular in order to maintain the alignment of the working tool 25 and/or the tool holder 24 relative to the target working line AL, as shown in FIGS. 7 and 8. This changes, for example, the angle of the adjusting axes L1, L2 relative to the adjusting swivel axis S, which penetrates the guide plane or guide surface 31 at right angles. At this point it should be noted that the adjusting swivel axis S is not stationary relative to the guide element 30, but is adjusted within the guide surface 31, for example with the movement component K1, if servo motors 51, 52 displace or adjust the working tool 25 or the tool holder 24 in parallel between the two positions shown in the example.

In FIGS. 7 and 8, the adjusting axes L1, L2 are adjusted anti-clockwise (FIG. 7) and clockwise (FIG. 8) about the adjusting swivel axis S. The adjusting axis L3 of the linear bearing 46 retains its parallel position relative to the flat side 26 or its perpendicular position relative to the axis of rotation D of the tool holder 24.

These measures are essential in particular because an operator is, so to speak, advancing the hand-held power tool 20 relative to the workpiece W, i.e. advancing or retracting it along the target working line, wherein they may not be able to maintain the angle of the guide element 30 relative to the target working line AL if they adjust the guide element 30 in the working direction AR or at least with a directional component relative to the working direction AR relative to the workpiece W, for example by advancing or retracting it. For this purpose, the operator can, for example, grasp the hand-held power tool by means of an operating handle 39, in particular a handle. The operating handle 39 is preferably located on the guide element 30, in particular on its rear area in the working direction AR, for example at or near the transverse side 33.

Due to inaccuracies in handling, when advancing or adjusting the hand-held power tool 20 with a directional component parallel to the target working line AL, the operator therefore not only ideally adjusts the relative position of the guide element 30 exactly along the target working line AL, but also unintentionally at angles to it, as shown in FIGS. 7 and 8. Nevertheless, the control device 60 keeps the working tool 25 on course, so to speak, i.e. it does not leave its orientation relative to the target working line AL, but can be adjusted by the operator along the working direction AR with a movement direction component at most.

An alternative bearing concept is implemented for the bearing arrangement 140 as shown in FIGS. 9 to 11. Identical or similar components known from the bearing arrangement 40 are provided with the same or similar reference numbers in the bearing arrangement 140.

The bearing arrangement 140 comprises a linear bearing 141 at the front in the working direction AR and a linear bearing 141, 142 at the rear in the working direction AR, the adjusting axes L1 and L2 of which extend transversely, preferably in at least one position approximately at right angles to the working direction AR.

The linear bearing 141 corresponds to the linear bearing 41 and is swivellably coupled with a rotary bearing 43 with an axis of rotation D1 to the drive unit 29 and thus to the tool holder 24.

On the other hand, the linear bearing 142 is rotationally coupled via a rotary bearing 144 to the drive unit 29 and thus to the tool holder 24. The rotary bearing 144 is located at the free end region of the bearing element of the linear bearing 42 and swivellably or rotatably connects it to the drive unit 29. The rotary bearing 144 has an axis of rotation D2.

However, a bearing receptacle 47 of the linear bearing 142 is not fixed to the guide element 30, as is the case with the linear bearing 42, but can be swivelled by means of a rotary bearing 145. The rotary bearing 145 supports both the bearing receptacle 47 and the servo motor 52, which is intended to drive the bearing element 46 of the linear bearing 142, swivellably about a swivel axis or axis of rotation D3, which passes orthogonally through the guide surface or the guide plane 31. At this point it should be noted that the axes of rotation D1, D2 or swivel axes of the rotary bearings 43, 44, 144 and 145 also pass orthogonally through the guide surface or the guide plane 31.

The rotary bearings 143, 144 have axes of rotation D1 and D2 similar to the rotary bearings 42, 44, which penetrate the guide surface 31 vertically or approximately vertically.

The bearing arrangement 40 therefore comprises two rotary bearings and three linear bearings. In contrast, the bearing arrangement 140 comprises only two linear bearings, but three rotary bearings. In both cases, parallel adjustment of the tool holder 24 relative to the adjusting swivel axis S is possible. The rotary bearings 43, 44 have bearing axes D1 and D2 which penetrate the guide plane or the guide surface 31 vertically or approximately vertically.

It can be seen in FIGS. 9, 10 and 11 that, even in the bearing arrangement 140, the control device 60 is easily able to maintain a swivel position of the tool holder 24 and the working tool 25 relative to the guide element 30 if it adjusts the guide element 30 and the tool holder 24 relative to each other with one or both of the movement direction components K1 and/or K2, in particular if it adjusts the guide element 30 relative to the tool holder 24. The working tool 25 always remains optimally aligned relative to the target working line AL, so that it does not tilt, for example in a kerf that has been sawn into the workpiece W.

A further bearing concept is shown in FIG. 12, namely using a bearing arrangement 240. Three rotary bearings 243, 244 and 245 are provided for the bearing arrangement 240. The rotary bearings 243, 244 are arranged in front of and behind the drive unit 29 and/or the tool holder 24 relative to the working direction AR.

The drive unit 29 is eccentrically connected to the rotary bearings 243, 244, namely by means of the connecting links 246, the attachment points D12 and D22 of which relative to the rotary bearings 243, 244 have eccentricities E1 and E2 relative to the axes of rotation D11 and D21 of the rotary bearings 243, 244.

The connecting member 246 between one of the rotary bearings 243 or 244, in the embodiment of the rotary bearing 243 or the rotary bearing at the front in the working direction, is firmly connected to the drive unit 29 or the tool holder 24, so that the latter swivels with eccentricity E1 about the axis of rotation D1. The other connecting link 246, on the other hand, is rotatably coupled to drive unit 29 and thus to tool holder 24, namely by means of a rotary bearing or swivel bearing 245. The rotary bearing 245 has an axis of rotation D31.

Rotary bearings 243, 244 are driven by a servo motor arrangement 250. For example, the servo motor arrangement 250 comprises servo drives or servo motors 251, 252 configured as rotary motors or rotary drives, with which the rotary bearing elements and thus the connecting elements 246 are rotatably or swivelably driven or can be driven. The servo motors 251, 252 are advantageously controlled by the control unit 60, for example wirelessly or wired, as already explained.

The bearing arrangement 240 also makes it possible for control device 60 to swivel working tool 25 about the adjusting swivel axis S by suitable control of the servo motors 251, 252, but also to adjust the working tool 25 relative to the guide element 30 while maintaining a respective swivel position or swivelled position relative to the adjusting swivel axis S with the movement direction components K1 and preferably also K2. The drawing in FIG. 12 shows that the working tool 25 is swivelled about the adjusting swivel axis S. However, it can be seen that the guide element 30 changes its relative position relative to the axis of rotation D or the tool holder 24 by this adjustment. This serves to keep the working tool 25 aligned with the target working line AL when guide element 30 is swivelled by the operator relative to the target working line AL.

The adjustment kinematics provided in the hand-held power tool 20 with the servo motor arrangement 50 and the bearing arrangement 40 as well as the alternative bearing arrangements 140, 240 and the alternative servo motor arrangement 250 are suitable for semi-automatic workpiece machining, in particular semi-automatic sawing operation, in which the operator guides hand-held power tool 20 along the workpiece W only in the working direction AR or against the working direction AR, for example to perform a saw cut along the target working line AL. Both for this largely automated sawing operation or largely automated workpiece machining and for the workpiece machining in which the hand-held power tool 20 is operated without the cooperation of the servo motor arrangement 50, 250 or the presence thereof, namely by the operator manually guiding the hand-held power tool 20 along the target working line AL, the methods described below, in which the definition of the target working line AL is considerably facilitated, are suitable.

For example, workpiece W is located in a working space R, see FIG. 1. The workpiece W is to be machined along the target working line AL, for example, a workpiece part W1 is to be cut off from a workpiece part W2. In order to make a straight saw cut, according to the prior art, a guide ruler or a guide rail would be placed on an upper flat side of the workpiece WO, along which the hand-held power tool 20 is to be guided. This is easily possible with the hand-held power tool 20, for example by means of the guide contours on the guide surface 31, which are not explained in detail, for engagement in the guide rail, which is also not shown, but this is not absolutely necessary with the principle explained below.

To determine the target working line AL, for example, the workpiece markers M1 and M2, which are at a distance from each other and between which the target working line AL, presently a straight line, should extend, are sufficient. For example, the workpiece markers M1 and M2 are line markers or dot markers on the upper flat side WO. With its underside, the lower flat side WO, the workpiece rests for example on a base, in particular on a work table, bearing blocks or the like. The working line AL is to be executed starting from a workpiece front side WS to the opposite workpiece front side between the longitudinal workpiece sides WLR and WLL.

However, the operator does not need to draw a connecting line between the workpiece markers M1 and M2 in order to locate or visually track the straight target working line AL, so to speak, but uses marker detection device 70 explained below. The marker detection device comprises a marker sensor 71, which is pin-shaped. For example, the operator can manually grasp the marker sensor 71, which is indicated by a schematic representation of an operator's hand H in FIG. 1.

The marker sensor 71 has a mechanical reference 72 in the form of its tip or longitudinal end, which the operator brings sequentially into coincidence with the workpiece marker M1 and the workpiece marker M2 by positioning the reference 72 at or on the respective workpiece marker M1, M2.

The marker detection device 70 detects the respective position of the workpiece marker M1, M2, namely their coordinate data KD1 and KD2, relative to an at least two-dimensional coordinates system KR2, which is clamped in the working space R. For example, the coordinates system KR2 can extend parallel to the workpiece flat side WO. For example, the coordinate data KD1 and KD2 each contain a value relating to the coordinate axes kx, ky of the coordinates system KR2, optionally a value relating to a coordinate axis kz of a coordinates system KR3. The coordinates system KR3 is a three-dimensional coordinates system.

The coordinates systems KR2 and KR3, for example, are stationary relative to the working space AR. However, in another embodiment, the coordinates systems KR2 and KR3 can also be stationary relative to the workpiece W.

However, a three-dimensional coordinate detection is preferred, i.e. the marker detection device 70 detects the coordinate data KD1 and KD2 as three-dimensional coordinate data.

For example, the two-dimensional coordinate data system K2 comprises coordinate axes kx and ky, the three-dimensional coordinates system KR3 additionally comprises a coordinate axis kz. The coordinates axes kx, ky and kz are preferably perpendicular to each other. For example, the coordinates axes kx and ky extend parallel to the flat side WO of the workpiece W, while the coordinates axis kz is perpendicular to it, creating a normal through the flat side WO, so to speak.

The coordinates systems KR2 and KR3 can naturally also be oriented differently relative to the working space R. However, in the embodiment shown in the drawing, the explained orientation of the coordinates system KR2 or KR3 is advantageous, e.g. the coordinates sensors 80, 81 can be placed directly on the flat side WO, so that the coordinates sensors 80, 81 have the same position relative to the coordinate axis kz.

Figure 14:
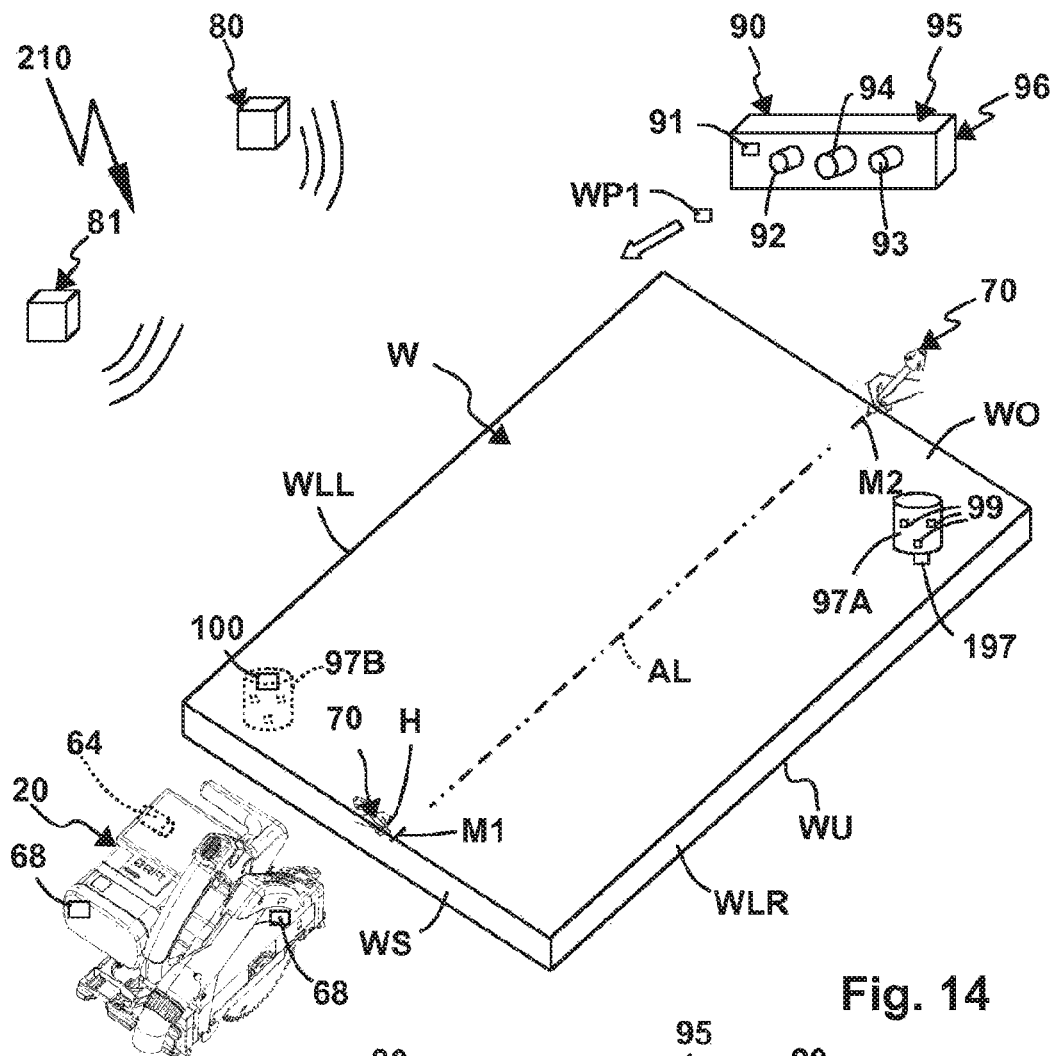
FIG. 14 shows a modification of the system as shown in FIG. 1, wherein the workpiece to be machined is arranged in a first position in the working space.
Figure 15:
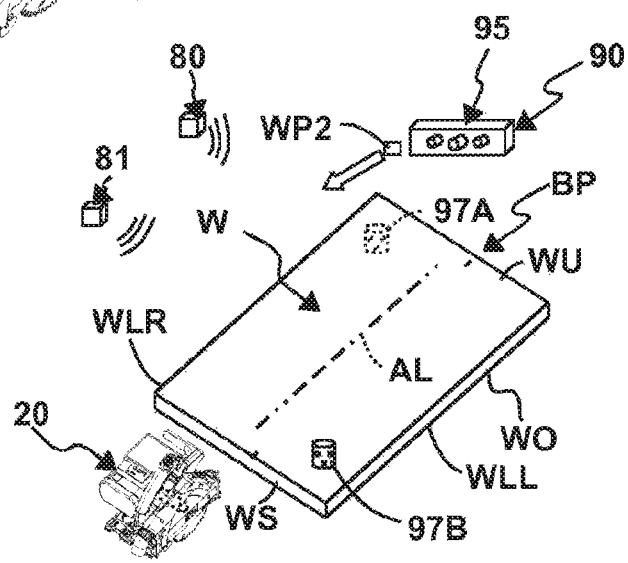
FIG. 15 shows the arrangement according to FIG. 14, wherein the workpiece to be machined is arranged in a second position in the working space.

Naturally, the coordinates sensors 80, 81 can also be positioned anywhere else in the working space R, as shown in FIGS. 14 and 15. In particular in this case, but also for positioning on the workpiece flat side WO, it is advantageous if at least one of the coordinates sensors 80, 81 is configured and/or usable to provide the three-dimensional coordinates system KR3.

Coordinates sensors 80, 81 can, for example, be set down on their undersides, on the flat side WO of the workpiece, on which there are utility surfaces 82. Thus, a position of a coordinates sensor 84, which is arranged in a housing 85 of the coordinates sensors 80, 81, is known in advance relative to the utility surface 82 provided on the housing 85, so that the coordinate axis kz need not be significant in itself, but can certainly be included in the following considerations.

The fastening means 83, e.g. the adhesive fastening means 83A, e.g. a rubber coating, and/or suction fastening means 86, e.g. a suction head or the like, may be provided on or in addition to the utility space 82 in order to improve the hold of the respective coordinates sensors 80, 81 on the workpiece W if the coordinate data KD1, KD2 are determined as explained below. A coordinate transmitter 84 of the coordinates sensor 80, 81 sends reference information RX and RY, for example a pattern of lines that are angled, for example perpendicular to each other. It is possible that the coordinate transmitter 84 transmits the respective line pattern or the reference information RX and RY sequentially or simultaneously. The reference information RX and RY are suitable for a three-dimensional acquisition of the coordinate data KD1, KD2, i.e. relative to the three-dimensional coordinates system KR3. However, it is also possible, for example, that the coordinates sensor 84 only transmits the reference information RX, which enables a two-dimensional orientation relative to the two-dimensional coordinates system KR2. For example, the reference information RX includes lines that extend parallel to the coordinate axis kz and are arranged side by side relative to the coordinate axes kx and/or ky. For example, the coordinate transmitter 84 sends the lines of the reference information RX and/or RY sequentially or simultaneously.

The coordinates sensors 80, 81 are arranged at a distance on the workpiece W. Consequently, it is even possible for the marker detection device 70 to determine its respective position in the coordinates system KR2 and/or KR3 by means of triangulation. However, based on the spatially spaced reference information RX and RY, it is sufficient if one of the coordinates sensors 80 or 81 is present.

The pieces of reference information RX and RY are, for example, light signals, microwaves or similar other reference information that can be transmitted contactlessly. The light signals can also be in the non-visible range, for example the infrared range or the ultraviolet range. In any case, the marker detection device 70 can, so to speak, locate and/or determine its respective position relative to the coordinates system KR2, KR3 by means of the at least one coordinates sensor 80 and/or 81 in order to detect the coordinate data KD1 and KD2.

At least one sensor 73, preferably an arrangement of several sensors 73, is arranged on the marker detection device 70.

For example, the sensors 73 are located at a longitudinal end area of the marker sensor 71 remote from the reference 72.

The sensors 73 are suitably spaced from one another so that at least one of the sensors 73 can receive the reference information RX and/or RY. The arrangement of sensors 73 at a distance from one another on the marker sensor 71 also enables triangulation or other spatial determination of the coordinates KD1, KD2 even if only one of the coordinates sensors 80, 81 is present.

The marker detection device 70 expediently has an inclination sensor 79 to determine the local relationship of the reference 71 to the at least one sensor 73 to provide the coordinate data KD1, KD2.

The marker detection device 70 can detect the coordinate data KD1, KD2 as a function of at least one triggering condition. For example, a marker sensor 71 may be a switch 75, in particular an electric pressure switch, an electric switch, preferably a pressure switch or the like. A capacitive or other manually actuated sensor is also suitable as a switch 75. When the operator actuates the switch 75, marker detection device 70 records the position of the respective reference 72 and thus determines the coordinate data KD1 and/or KD2.

Alternatively or additionally, a time condition is also suitable as a triggering condition. For example, if the operator holds the reference 72 at the reference 72 for a predetermined period of time, such as 10 seconds or longer, this is interpreted as a triggering condition to detect the coordinate data KD1 or KD2 from the marker detection device 70. The marker detection device 70 has, for example, a motion sensor 77, to determine a predetermined dwell time of the reference 72 at one of the workpiece markers M1 or M2.

It is also possible for the marker detection device to determine the coincidence or spatial arrangement of the reference 72 at the workpiece marker M1 or M2 on the basis of a distance measurement, for example using a distance sensor 76, for example an optical sensor. For example, in comparison to the workpiece surface on the flat side WO, the workpiece marker M1 or M2 is a contrasting workpiece marker that can be detected optically.

If the marker detection device 70 has acquired the coordinate data KD1 and KD2, it can transmit them to the hand-held power tool 20 by means of a transmitter 74, for example. One embodiment of the invention may provide that a holding fixture 38, for example a plug-in fixture, is provided on the hand-held power tool 20 for holding the marker detection device 70. For example, it can be inserted into the holding fixture 38.

The marker detection device 70 transmits the coordinate data KD1 and KD2 by means of its transmitter 74 wirelessly or via a wired network to an interface of the hand-held power tool 20, for example a Bluetooth interface, a USB interface, an 120 interface or the like. The interface 64 and the coordinates sensor 84 have for example USB bus interfaces, I2C bus interfaces, WLAN interfaces, Bluetooth interfaces or the like. The interface 64, for example, can be located in the holding fixture 38. However, the holding fixture 38 is not necessary, i.e. the marker detection device 70 does not necessarily have to be attached to the hand-held power tool 20 in order to transmit the coordinate data KD1, KD2.

The control device 60 has a processor 61 and a storage device 62. A control program 63 is stored in the storage device 62, for example, which contains program code executable by the processor 61. The control program 63 forms a guide means 65 for guiding the hand-held power tool 20 according to the coordinate data KD1 and KD2 in a working area, present along the target working line AL.

For example, the guide means 65 read the coordinate data KD1, KD2, each of which contains partial coordinates relative to the coordinate axes kx, ky and kz. Using methods known per se from the descriptive geometry, the guide means 65 can determine the working area data AD representing the working line AL from the coordinate data KD1 and KD2, preferably storing them in the storage device 62. For example, to determine the working area data AD, the guide means 65 forms a vector difference between the coordinate data KD1 and KD2.

The guide means 65 then guides the hand-held power tool 20 along the working line AL, wherein the servo motor arrangement 50 is controlled so that the working tool 25 moves along the working line AL. In this connection, it is also advantageous if the hand-held power tool 20, in particular the guide means 65, is oriented to the coordinates system KR2 or KR3, for which the coordinates sensors 80 and/or 82 are advantageous. For example, on the hand-held power tool 20 sensors 66, in particular a plurality or at least two sensors 66 are provided for the receipt of reference information RX and/or RY. In this way, the hand-held power tool can always determine its position in the working space R, especially relative to the target working line AL.

The sensors 66 are components of an orientation means 67 of the hand-held power tool 20 for orientation in the working space R and/or relative to coordinates system KR2 and/or KR3.

In the form of sensors 67, the marker detection device 70 has orientation means 78 with which it can orient itself relative to the coordinates system KR2, KR3.

The guide means 65 determines the working area data AD for the target working line AL, for example a starting point for the straight line representing the working line AL and the further course relative to the coordinate axes kx and ky, optionally kz.

Naturally, instead of the linear working area, a two-dimensional or flat working area, for example for milling the workpiece W, can also be determined in the aforementioned way. For example, a further workpiece marker M3 could be detected by the marker detection device 70. The workpiece markers M1, M2 and M3 are provided, for example, at the corners of a triangle whose surface is to be ground or milled by a hand-held power tool according to the invention. The marker detection device 70 determines in the manner described above, for example, coordinate data KD1, KD2, KD3 of the workpiece markers in M1, M2 and M3 and transmits these or working area data AD2 already defining the working area AB, which is located in the area defined by the workpiece markers M1, M2 and M3, to the hand-held power tool 20. It is also possible that the control device 60 itself determines the working area data AD2 defining the working area AB, for example by using the control program 63.

Finally, the working area data AD does not necessarily have to represent a straight line. In particular, if a hand-held power tool according to the invention is designed as a jigsaw, a course with bends and curves is also possible. For example, it may be necessary to saw a target working line AL2 in the workpiece W, which extends from the workpiece marker M1 via the workpiece marker M4 to the workpiece marker M2. The marker sensor 71 must be positioned on the workpiece markers M1, M4 and M2 so that its reference 72 records the respective coordinate data of the workpiece markers M1, M4 and M2. The guide means 65 and/or marker detection device 70 can then, for example, provide an arc-shaped line or a triangular line defined by the workpiece markers M1, M4 and M2 as a target working line AL2 for guiding the hand-held power tool 20.

The operator is assisted in guiding the hand-held power tool 70 preferably by an optical display, in particular a display device 55, of the hand-held power tool. This is indicated schematically in FIG. 5. The display device 55, for example, is located on the side of the hand-held power tool 20 facing away from the guide surface 31, in particular the top side, so that it can be easily seen by the operator. The display device 55 preferably indicates on the display device 55 an adjustment range SB adjustable by the servo motor arrangement 50, so to speak a corridor or window, within which the working tool 25 can be adjusted by the servo motor arrangement 50 relative to the target working line AL to be held.

The operator is also provided with additional useful information on the display device 55, for example an actual indicator IP indicating an actual position of the working tool 25 and/or a deviation indicator IA indicating a deviation of the guide element 30 from an ideal line, the target working line AL. The indicators IA and IP are expediently linear.

Figure 5:
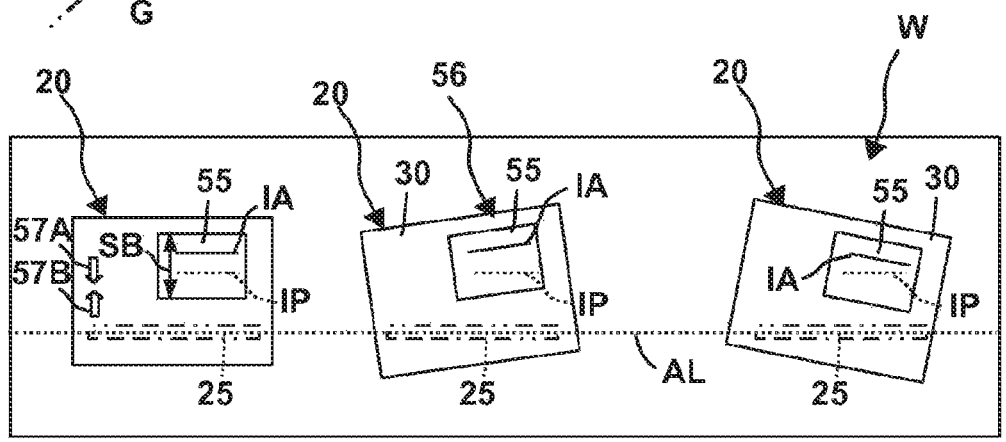
FIG. 5 shows a schematic top view of the workpiece as shown in FIG. 1 and the hand-held power tool as shown in FIG. 1 during workpiece machining, wherein a display device is schematically represented.

For example, it can be seen in FIG. 5 that the indicators IA and IP are parallel but offset in the left position of the hand-held power tool 20 relative to the workpiece W, and the markers or indicators IA and IP have different angular and transverse distances from each other in the middle and right illustrations of the hand-held power tool 20. This tells the operator how to optimally advance the hand-held power tool 20 relative to the target working line AL or which angle to set in order to make work easier for the servo motor arrangement 50, so to speak.

Instead of or in addition to the display device 55, which represents an output device 56 or a component of an output device 56, there may also be provided, for example, indicator lights 57A, 57B, which indicate to the operator by means of coloured light, for example red and green, and/or optical symbols (arrows or the like) whether the hand-held power tool 20 is optimally guided in the area of the target working line AL or along the target working line AL.

Furthermore, an acoustic signal may also be useful. For example, the output device 56 has a speaker 58 which gives an acoustic signal to the operator, for example by means of a warning tone, when they guide the guide element 30 in such a way that the adjustment area adjustable by the servo motor arrangement 50 is exceeded.

The above-mentioned visual indicators IA and IP and/or the indicator lights 57A, 57B can also be used without servo motor arrangements 50, 150 when the hand-held power tool 20 is manually guided along the target working line AL. These indication means can be used to indicate to the operator how to operate the hand-held power tool 20 in order to maintain the target working line AL.

A further sensory concept for the detection of workpiece markers M1, M2 is illustrated using a system 110 as shown in FIG. 4. A marker detection device 170, like the marker detection device 70, is a separate component from the hand-held power tool 20, without a drive and therefore mobile and easy to handle. A marker sensor 171 of the marker detection device 70 has, for example, a housing 176 which, for example, could be applied as a mechanical reference directly to one or both of the workpiece markers M1 or M2, for example with its longitudinal side or the like. However, an optical concept has been implemented in which an optical reference 172, namely a light beam, is output by a light source 173. The light source 173 includes, for example, a laser beam or the like which the operator directs at the workpiece markers M1 and M2.

The marker detection device 171 also has a camera 175 and a transmitter 174 for coordinate data KD1 and KD2, which can be determined using the camera 175. For example, the camera 175 records the workpiece markers M1, M2 relative to a so to speak optical or mechanical coordinates sensor 180.

For example, the coordinates sensor 180 comprises a surface 181, in particular a strip, which can be placed along the working line AL or next to the working line AL by an operator on the workpiece W. The surface 181 is provided with identifiers 182 in a unique pattern to which marker detection device 170 can orient itself. The identifiers 182 include, for example, a cube pattern with uneven distribution or the like. The coordinates sensor 180, for example, can be fastened to the workpiece W using the fastening means 183, in particular hooks, which can be attached to the workpiece end faces WS. Naturally, the surface 181 can also be formed by a film or a wall or the like, which can adhere to the flat side WO due to negative pressure or the like of other adhesion. Using the camera 174, the marker detection device 170 accordingly detects the workpiece markers M1 and M2 relative to the coordinates sensor 180 and displays this on a display device 175. For example, the marker detection device 70 can determine coordinate data KD1 and KD2 on the basis of a distance between, on the one hand, the workpiece marker M1, M2 and, on the other hand, the coordinates sensor 180 and transmit them to the interface 64 of the hand-held power tool 20 using its coordinates sensor 174.

The hand-held power tool 20 has orientation means 167, for example a camera 166, for orientation on the coordinates sensor 180. The control device 60, for example, controls the servo motor arrangement 50 to maintain the target working line AL, wherein it evaluates data from the camera 166 or the orientation means 167.

It is also possible that only one workpiece marker is detected, for example the workpiece marker M1, which then defines the starting point for the working area to be machined. If, in this case, the orientation of the workpiece marker M1 is also known, for example a directional component relative to the target working line AL, this information is sufficient for the marker detection device 70 and/or control device 60 to determine the target working line AL.

Furthermore, default data VO, in particular CAD data, can be stored and/or created on a computer 11, e.g. by a CAD program which defines the working area, e.g. the course and/or length of the working line AL, the geometry of the working area AB or the like. To position or locate this working area, for example a working line or a surface to be machined, on the workpiece W, so to speak, the operator can use the marker detection device 70 to index the workpiece marker M1, for example, and transmit its coordinate data KD1 to the hand-held power tool 20. This has a receiving interface 69 for receiving default data VO. Using default data VO and coordinate data KD1 of the workpiece marker M1, for example, the target working line AL or AL2 or also the flat area AB can be defined. For example, the control program 63 determines the working area data AD on the basis of default data VO and coordinate data KD1.

In the previous embodiments, it was assumed that the workpiece W remains in place relative to the two-dimensional or three-dimensional coordinates system KR2 or KR3 after the detection of at least one workpiece marker M1, M2. However, it is also possible that the workpiece W is moved between the detection of the workpiece marker(s) and the workpiece machining, which is explained in more detail in the embodiment shown in FIGS. 14 and 15.

For example, it is possible that the marker detection device 70 first detects two workpiece markers M1 and M2 and then the workpiece W is brought into a different position relative to the coordinates sensors 80, 81, which are preferably arranged freely in the working space R, but in any case are not placed on the workpiece W to be machined, as in the previous embodiments. Thus, the workpiece markers M1 and M2 are, so to speak, related to a two-dimensional or three-dimensional coordinates system that is completely independent of the workpiece W.

Now it is possible, for example by means of a camera 90, which is also freely arranged in the working space R, to follow workpiece movements of the workpiece W after the detection of the workpiece markers M1 and M2, so to speak. For example, the camera 90 transmits coordinate data of the workpiece W to the hand-held power tool 20. This data indicates the position of the workpiece W when the workpiece markers M1 and M2 are detected.

For example, by means of a wireless or wired transmitter 91, the camera 90 sends to the interface 64 coordinate data of the workpiece W, namely workpiece position data WP1, while capturing the workpiece markers M1 and M2 as shown in FIG. 14.

If the workpiece W is then moved, for example swivelled about an axis parallel to the working line AL, so that the flat side WU comes up, so to speak (FIG. 15) and the workpiece W takes up a machining position BP, the camera 90 in turn captures the coordinate data of the workpiece W, namely the workpiece position data WP2, which the camera 90 in turn sends to the interface 64 of the hand-held power tool 20.

The control program 63 can determine the working area data AD using coordinate data KD1 and KD2 of the workpiece markers M1 and M2 and the workpiece position data WP1 WP2, which the camera 90 determines using the position of the workpiece W1 when the workpiece markers M1 and M2 are detected and immediately before machining by the hand-held power tool, according to FIG. 15. For example, the control program 3 forms a difference between the workpiece position data WP2 and WP1 and transforms the coordinate data KD1, KD2 with the corresponding tracking data VD obtained from the difference.

Naturally, in addition to the workpiece position data WP1 and WP2, the camera 90 can also determine further workpiece position data that is entered into the tracking data VD, for example during the movement of the workpiece W to the machining position BP.

The camera 90 is preferably a stereo camera, which has two combinations of lens and sensor 92, 93 in order to record stereoscopically and thus spatially the position of the workpiece W in the working space R. Preferably, the camera 90 also has a projector 94, for example for projecting a stripe pattern or other identification structure or a relief pattern. Thus the camera can, for example, determine a three-dimensional image of the workpiece W.

At this point it should be added that the hand-held power tool can naturally also be guided interactively with the camera 90, i.e. that, for example, the guide means 65 receive from the camera 90 a respective relative position of the hand-held power tool relative to the coordinates system KR2 or KR3 in order to guide the working tool 25 according to the target working line AL.

The camera 90 forms a coordinate detection device 95, which can, for example, record the coordinates of the workpiece W and/or the hand-held power tool 20 relative to the coordinates system KR2 or KR3.

Coordinate detection or position detection can be facilitated by the fact that, for example, one or a plurality of device reference markers 68 are arranged on the hand-held power tool 20 and/or one or more workpiece position reference markers 98 are arranged on the workpiece W.

The device reference markers 68 are preferably arranged at relatively large distances on the hand-held power tool 20, for example on opposite extremities of the machine housing 29. The device reference markers 68 include, for example, reflective markers, contrast markers or the like which are detectable by the camera 90.

For example, the coordinates sensor 180 is suitable as a workpiece position reference marker. Three-dimensional markers may also be provided as workpiece position reference markers, for example base bodies or housings of workpiece position detection devices 97 explained below. The camera 90 can record their position, so to speak, in the position shown in FIG. 14 and in the processing position BP according to FIG. 15.

The workpiece position detection devices 97A, 97B can, for example, be detachably attached to the workpiece W by means of fastening means 197, for example adhesive means, in particular adhesive elements, suction heads or the like. For example, the workpiece position detection device 97A is located on the flat side WO, and the workpiece position detection device 97B on the flat side WU.

A concept in which the workpiece position detection devices 97A, 97B so to speak actively detect their respective position and thus the position of the workpiece W in the working space R is expedient. The workpiece position detection devices 97B, 97B have, for example, sensors 99 to receive reference information RX and/or RY of the coordinates sensors 80, 81. The workpiece position detection devices 97B, 97B can thus transmit workpiece position data WP1, WP2 corresponding to the respective position of the workpiece W during the detection of workpiece markers M1, M2 (FIG. 14) and the machining position BP provided for machining by the hand-held power tool 20 (FIG. 15) to the control device 60, for example wirelessly or via a wired network via the interface 64, for which purpose they have, for example, wired and/or wirelessly transmitting transmitters 100.

Using the workpiece position data WP1, WP2, the control device 60 can, for example, determine tracking data VD in order to determine the target working line AL, which is now located on the upturned flat side WU, using this tracking data VD and coordinate data KD1, KD2 of the workpiece markers M1, M2.

Figure 17:
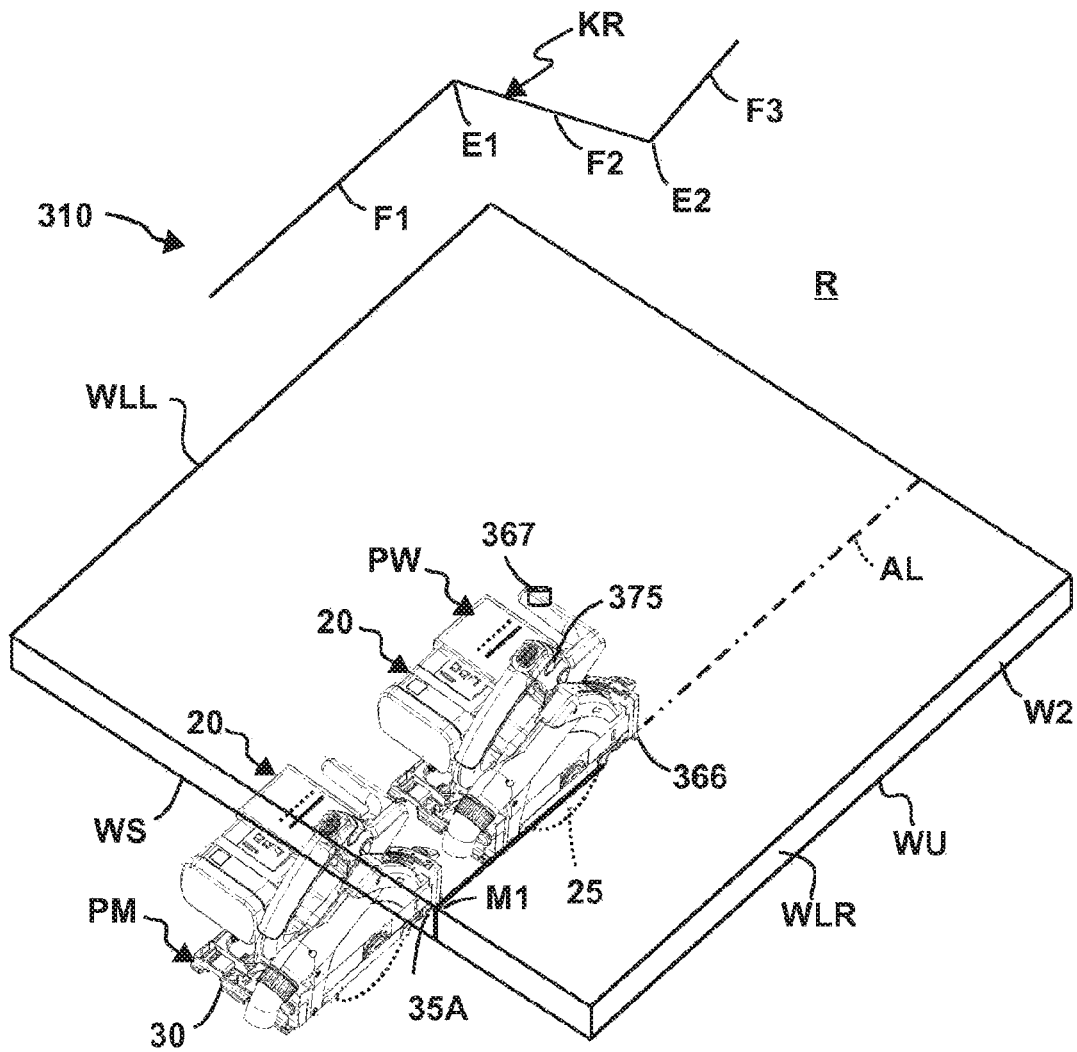
FIG. 17 shows a system with a hand-held power tool having a camera.

In the system 310 shown in FIG. 17, the hand-held power tool 20 has one or more cameras 366, 367. The at least one camera 366, 367 can, for example, first detect a workpiece marker in a detection position or measuring position PM. The workpiece marker is defined, for example, by an optical workpiece marker of the type of the workpiece marker M1, for example a pencil mark and/or an imaginary line, or a desired distance between, on the one hand, the longitudinal side 35 of the guide element 30, which in this case provides or forms a mechanical reference 35A, and the longitudinal side of the workpiece WLR. While the workpiece marker is being detected, the drive motor 22 is switched off, which is why the hand-held power tool 20 is optimally stationary relative to the workpiece W for detecting its current position and thus the reference 35A. Furthermore, the handling is simple.

For example, the at least one camera 366 is located near the guide element 30. On the other hand, the camera 367 is positioned at a distance from the guide element 30, for example on the machine housing 21. For example, the at least one camera 366, 367 detects a position of the hand-held power tool 20 in the working space R on the basis of a detection of a space contour KR of the working space R. For this purpose, the operator can, for example, tap the switch 23 without switching on the drive motor 22. However, a special switch 375, such as the switch 75 of the marker detection device 70, may also be provided to detect the reference position or the position of at least one workpiece marker M1.

The space contour KR, for example, includes surfaces F1, F2 and F3 that are at an angle to each other. Between the surfaces F1, F2 there is a space-inside corner E1, between the surfaces F2 and F3 a space-outside corner E2. In this way, the hand-held power tool 20 can orient itself, so to speak, in the working space AR on the basis of the space contour KR in order, for example, to first determine the workpiece marker M1 in a detection position PM and then, after switching on the drive motor 22, to guide the working tool 25 relative to the target working line AL using the guide means 65.

Instead of one or more of the cameras 366, 367 and/or the camera 90, a lidar, radar or the like can of course also be provided, which is suitable for recording the space contour KR or for determining the position of, for example, the hand-held power tool 20.

Figure 18:
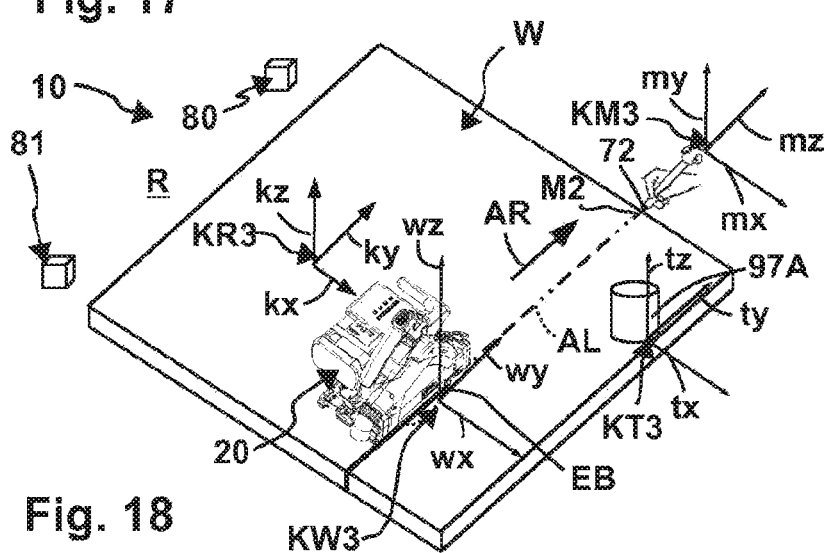
FIG. 18 shows the system shown in FIG. 1, but with a plurality of local coordinates systems.

Some transformation processes of coordinates and coordinates systems will be explained using the embodiment shown in FIG. 18. For example, the coordinates system KR3 is fixed with regard to the working space R and is, so to speak, specified by the coordinates sensors 80 and/or 81. The coordinates sensors 80, 81 can be freely arranged in the working space R, i.e. away from the workpiece W.

For example, the marker detection device 70 has a local three-dimensional coordinates system KM3, whose coordinate axes mx, my and mz are at an angle to each other. The point of reference 72 is distant from this coordinates system KM3, for example relative to the axis mz, by a distance value, for example 5 cm. As a quaternion, for example, the location of the reference 72, in the drawing example at the same time as the workpiece marker M2, where the reference 72 is located according to FIG. 18, is described as $$Q[72]=(0,0,0\ -5)$$

When using quaternions relative to the marker detection device 70, for example, it is possible, on the one hand, to detect the quaternion of the reference 72 or the workpiece marker M2 and, on the other hand, the quaternion of the coordinates system KM3, which are multiplied together to obtain an intermediate quaternion.

The coordinates of the workpiece marker M2 are now obtained by multiplying the intermediate quaternion by the intermediate quaternion-1 (the inverted quaternion).

The sensors 73 of the marker sensor 71 or the marker detection device 70 determine the position of the local coordinates system KM3, which is related to the marker detection device 70, relative to the global coordinates system KR3, which is stationary relative to the working space R, in particular by means of a translational displacement of the coordinates system KM3 relative to the coordinates system KR3. In addition, the sensors 73 or their evaluation device, which is not shown individually in the drawing, can determine the rotation of the coordinates system KM3 relative to the coordinates system KR3, for example using formulae (1), (2) and (3) mentioned above. In this way the location or point of reference 72, i.e. the workpiece marker M2, can be converted to the coordinates system KR3. This can be achieved, as explained, by the marker detection device 70, but also, for example, by the control device 60 of the hand-held power tool 20 if it receives coordinate data of the workpiece marker M2 or the location of the reference 72 and at least one piece of information about the orientation of the local coordinates system KM3 of the marker detection device 70.

The guide means 65 or the control device 60 can also operate with a local coordinates system related to the hand-held power tool 20, for example a coordinates system KW3 related to the hand-held power tool 20, which has coordinate axes wx, wy and wz which are perpendicular to each other. These can also be converted to the global coordinates system KR3, which is related to the working space R, using the rotation matrices (1), (2) and (3) mentioned above, for example, using the program code that the control program 63 contains and that the processor 61 can execute. For example, the guide means 65 or control device 60 can relate the coordinates of a penetration area EB, for example a front cutting edge into the workpiece W, of the working tool 25 to the local coordinates system KW3 in order to position and/or guide the working tool 25 optimally relative to the working area AB, in particular the working line AL.

In the same way, the position of the workpiece W in the working space R can also be tracked, for example using the workpiece position detection device 97, which also has its local coordinates system KT3 with coordinate axes tx, ty and tz, which is mobile, so to speak, relative to the working space R. The location of the reference 72 or the workpiece marker M2 is known in the situation shown in FIG. 18 relative to the local coordinates system KM3 of the marker detection device 70 and relative to the coordinates system KT3 of the workpiece position detection device 97. If the position of the workpiece marker M2 on the coordinates system KT3 is now known and the workpiece W is then moved, the new position of the coordinates system KT3 can be determined after the repositioning of the workpiece W, for example its rotation and/or translational displacement, to which the location or the coordinates of the workpiece marker M2 are related. This allows the new coordinates of the workpiece marker M2 to be determined relative to the global coordinates system KM3, which refers to the working space R. A rotation of the workpiece W about an axis, for example about its longitudinal axis or about a longitudinal central axis, can be tracked in particular by means of the formulae (1)-(3) mentioned at the beginning relative to the coordinates system KR3.

| | | | |
|---|---|---|---|
| 10 | System | 60 | Control device |
| 11 | Computer | 61 | Processor |
| 12 | | 62 | Storage device |
| 13 | | 63 | Control program |
| 20 | Hand-held power tool | 64 | Interface for 70 |
| 21 | Machine housing | 65 | Guide means |
| 22 | Drive motor | 66 | Sensors |
| 22A | Gear | 67 | Orientation means |
| 23 | Switch | 68 | Device reference marker |
| 24 | Tool holder Axis of rotation D | 69 | Receiving interface |
| 25 | Working tool 25A Cutting tool | 70 | Marker detection device |
| 26 | Flat side | 71 | Marker sensor |
| 27 | Front edge of 25 | 72 | Reference |
| 28 | Energy storage device | 73 | Sensors |
| 28A | Power supply cable | 74 | Coordinate data transmitter |
| 28B | Power plug | 75 | Switch |
| 29 | Drive unit | 76 | Distance sensor |
| 30 | Guide element | 77 | Motion sensor |
| 31 | Guide surface | 78 | Orientation means |
| 32 | Front transverse side | 79 | Tilt sensor |
| 33 | Rear transverse side | 80 | Coordinates sensor |
| 34 | Left longitudinal side | 81 | Coordinates sensor |
| 35 | Right longitudinal side | 82 | Utility surface |
| 36 | Depth adjustment bearing Depth adjusting axis T | 83 | Adhesive fastening means |
| 37 | Mitre bearing Mitre axis G | 84 | Coordinate transmitter |
| 38 | Holding fixture | 85 | Housing |
| 39 | Operating handle | 86 | Suction fastening means |
| 40 | Bearing arrangement | 87 | |
| 41 | Linear bearing | 88 | |
| 42 | Linear bearing | 89 | |
| 43 | Rotary bearing 243 | 90 | Camera |
| 44 | Rotary bearing 244 | 91 | Transmitter |
| 45 | Linear bearing 145 Rotary bearing 245 | 92 | Lens/Sensor |
| 46 | Bearing member of 41, 42 | 93 | Lens/Sensor |
| 47 | Bearing receptacle 41, 42 | 94 | Projector |
| | | 95 | Coordinate detection device |
| | | 96 | Tracking means |
| | | 97 | Workpiece position detection device |
| 48 | Rollers of 47 | 98 | Workpiece position reference marker |

-continued

| | | | |
|---|---|---|---|
| 49 | | 99 | Sensors |
| 50 | Servo motor arrangement | 100 | Transmitter |
| 51 | Servo motor | 197 | Fastening means |
| 52 | Servo motor | | |
| 53 | | | |
| 54 | | | |
| 55 | Display device | | |
| 56 | Output device | | |
| 57 | Indicator lights | | |
| 58 | Speaker | | |
| 59 | | | |
| W | Workpiece | R | Working space |
| WO | Upper flat side WU Lower flat side | IN | Indicator |
| WS | Workpiece front side | IP | Actual position |
| WL | R/L Workpiece longitudinal side | AB | Adjustment area |
| | | AB | Working area |
| | | AD | Working area data |
| VO | Default data | KDx | Coordinate data |
| WP1 | Workpiece position data | RX | RY Reference information |
| WP2 | Workpiece position data | kx | ky kz Coordinates axes |
| VD | Tracking data | KR2 | KR3 Coordinates system fixed |
| SP1 | SP2 Adjusting positions | Mx | Workpiece marker |
| IA | Deviation indicator | L1 L2 L3 | Adjusting axes of 41, 42, 45 |
| IP | Actual indicator | S | Adjusting swivel axis |
| AB | Adjustment area | K1 | Movement component Transverse to AR |
| EB | Penetration area | K2 | Movement component along AR |
| | | AL | Target working line |
| | | AR | Working direction |
| 166 | Camera | KR | Space contour |
| 167 | Orientation means | 180 | Coordinates sensor |
| | | 181 | Surface |
| 170 | Marker detection device | 182 | Identifier |
| 171 | Marker sensor | 183 | Fastening means |
| 172 | Optical reference | | |
| 173 | Light source | | |
| 174 | Transmitter | 240 | Bearing arrangement |
| 175 | Camera | 241 | |
| 176 | Housing | 242 | |
| | | 243 | Rotary bearing |
| | | 244 | Rotary bearing |
| | | 245 | Rotary bearing |
| | | 246 | Connecting member |
| | | 250 | Servo motor arrangement |
| | | 251 | Servo motor rotary drive |
| | | 252 | Servo motor rotary drive |

The invention claimed is:

1. A hand-held power tool for machining a workpiece, the power tool comprising:
a drive motor,
a tool holder drivable by the drive motor, and the tool holder being for a working tool for machining the workpiece, and
a guide element having a guide surface, the guide surface guiding the hand-held power tool on the workpiece in a working direction along which the working tool is moved to machine the workpiece,
wherein the tool holder is mounted via a bearing arrangement such that the tool holder moves relative to the guide element and said tool holder is drivable by a servo motor arrangement, wherein the hand-held power tool is configured to be swivelled via the bearing arrangement about at least one adjusting swivel axis passing through the guide surface at an angle, for relative adjustment of the tool holder relative to the guide element, wherein the bearing arrangement comprises at least two linear bearings with each of the linear bearings having a bearing linear axis, and each of the bearing linear axes is oriented transversely to the working direction,
wherein the hand-held power tool has a control device for controlling the servo motor arrangement, the control device adjusting a position of the tool holder relative to the guide element and maintaining a swivel position relative to the at least one adjusting swivel axis; and
wherein the control device adjusts the tool holder relative to the guide element wherein the tool holder maintains an angular position relative to the working direction when the tool holder is adjusted relative to the guide element transversely to the working direction.

2. The hand-held power tool according to claim 1, further comprising at least one operating handle for adjusting the guide element in the working direction or against the working direction, wherein the servo motor arrangement and the bearing arrangement are arranged between the tool holder and the at least one operating handle.

3. The hand-held power tool according to claim 1, wherein the working tool includes a cutting tool with a flat shape, and the drive motor is configured for rotatably driving the tool holder.

4. The hand-held power tool according to claim 3, wherein the control device controls the servo motor arrangement for a parallel movement of the cutting tool relative to the guide element in a plane parallel to a flat side of the cutting tool.

5. The hand-held power tool according to claim 1, wherein the control device is configured to adjust the tool holder relative to the guide element in such a way that the tool holder maintains the angular position relative to an at least two-dimensional coordinates system, the at least two-dimensional coordinates system being independent of a workpiece marker provided on the workpiece.

6. The hand-held power tool according to claim 1, wherein the adjusting swivel axis is not stationary relative to the guide element.

7. The hand-held power tool according to claim 1, wherein the servo motor arrangement comprises a first servo motor and a second servo motor.

8. The hand-held power tool according to claim 1, wherein the servo motor arrangement includes at least one linear drive.

9. The hand-held power tool according to claim 1, further comprising a display device for displaying an actual position, set by the servo motor arrangement, of the tool holder and/or of the working tool arranged on the tool holder and/or for displaying a target position, to be set by the servo motor arrangement, of the tool holder and/or of the working tool arranged on the tool holder.

10. The hand-held power tool according to claim 1, wherein the servo motor arrangement and/or the bearing arrangement does not project laterally in front of the guide surface of the guide element.

11. The hand-held power tool according to claim 1, wherein the bearing arrangement comprises three rotary bearings.

12. The hand-held power tool according to claim 1, wherein the tool holder is provided on a drive unit of the hand-held power tool comprising the drive motor and the drive unit is mounted movably relative to the guide element via the bearing arrangement.

\* \* \* \* \*